US010154013B1

(12) United States Patent
Miller et al.

(10) Patent No.: US 10,154,013 B1
(45) Date of Patent: Dec. 11, 2018

(54) UPDATING ENCRYPTED CRYPTOGRAPHIC KEY

(71) Applicant: Amazon Technologies, Inc., Seattle, WA (US)

(72) Inventors: Derek Del Miller, Austin, TX (US); Nachiketh Rao Potlapally, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/610,509

(22) Filed: May 31, 2017

Related U.S. Application Data

(62) Division of application No. 14/658,137, filed on Mar. 13, 2015, now Pat. No. 9,674,162.

(51) Int. Cl.
*G06F 21/00* (2013.01)
*H04L 29/06* (2006.01)
*G06F 12/14* (2006.01)

(52) U.S. Cl.
CPC ...... *H04L 63/0435* (2013.01); *G06F 12/1408* (2013.01); *H04L 63/0442* (2013.01); *G06F 2212/1052* (2013.01)

(58) Field of Classification Search
CPC ............. H04L 63/0435; H04L 63/0442; G06F 12/1408; G06F 2212/1052
See application file for complete search history.

(56) References Cited

U.S. PATENT DOCUMENTS

| 5,828,753 | A | 10/1998 | Davis |
| 5,844,986 | A | 12/1998 | Davis |
| 6,085,320 | A | 7/2000 | Kaliski, Jr. et al. |
| 6,708,273 | B1 | 3/2004 | Ober et al. |
| 7,069,452 | B1 | 6/2006 | Hind et al. |
| 7,159,241 | B1 | 1/2007 | Horiguchi et al. |
| 7,215,781 | B2 | 5/2007 | Grawrock |
| 7,379,549 | B2 | 5/2008 | Pelly et al. |
| 7,434,263 | B2 | 10/2008 | Lampson et al. |
| 7,543,139 | B2 | 6/2009 | Camenisch et al. |
| 7,751,559 | B2 * | 7/2010 | Greco .................. H04L 9/0822 380/277 |
| 7,801,308 | B1 * | 9/2010 | Hang .................. H04L 9/0822 380/277 |

(Continued)

OTHER PUBLICATIONS

U.S. Appl. No. 14/574,299 , "Reduced Overhead for Cryptographic Operations", U.S. Patent Application, filed Dec. 17, 2014.

(Continued)

*Primary Examiner* — Don G Zhao
(74) *Attorney, Agent, or Firm* — Kilpatrick Townsend & Stockton LLP

(57) ABSTRACT

A computing device has a processor and a first memory, e.g., a fuse-based memory, storing a first cryptographic key. The processor is configured to receive information related to a second cryptographic key from a cryptographic key provisioning system. The processor derives the second cryptographic key from the information related to a second cryptographic key. The first cryptographic key has fewer bits than the second cryptographic key. The processor is also configured to encrypt the second cryptographic key using the first cryptographic key, and store the encrypted second cryptographic key in a second memory, e.g., a flash memory.

15 Claims, 16 Drawing Sheets

(56) References Cited

U.S. PATENT DOCUMENTS

| | | |
|---|---|---|
| 7,802,092 B1 | 9/2010 | Kelly et al. |
| 8,230,231 B2 | 7/2012 | Freeman et al. |
| 8,291,229 B2 | 10/2012 | Dahmen et al. |
| 8,458,459 B2 | 6/2013 | Lieber |
| 8,484,451 B2 | 7/2013 | Sibert et al. |
| 8,560,823 B1 | 10/2013 | Zhang et al. |
| 8,819,839 B2 | 8/2014 | Henry et al. |
| 8,972,730 B2 | 3/2015 | Schmit et al. |
| 9,015,837 B1 | 4/2015 | Petkov et al. |
| 9,055,059 B1 | 6/2015 | Andrews et al. |
| 9,172,535 B2 * | 10/2015 | Yokota .................. G06F 21/10 |
| 9,305,185 B1 | 4/2016 | Pedersen et al. |
| 9,479,340 B1 | 10/2016 | Potlapally et al. |
| 2001/0002487 A1 | 5/2001 | Grawrock et al. |
| 2002/0199110 A1 | 12/2002 | Kean et al. |
| 2003/0097579 A1 | 5/2003 | England et al. |
| 2004/0025010 A1 | 2/2004 | Azema et al. |
| 2004/0025027 A1 * | 2/2004 | Balard ..................... G06F 21/31 |
| | | 713/183 |
| 2004/0125949 A1 | 7/2004 | Seifert et al. |
| 2005/0005286 A1 | 1/2005 | Koskela et al. |
| 2005/0132182 A1 | 6/2005 | Challener et al. |
| 2005/0160476 A1 | 7/2005 | Kakii et al. |
| 2005/0180572 A1 | 8/2005 | Graunke |
| 2006/0072762 A1 | 4/2006 | Buer |
| 2006/0256967 A1 | 11/2006 | Beuque et al. |
| 2007/0033419 A1 | 2/2007 | Kocher et al. |
| 2007/0083750 A1 | 4/2007 | Miura et al. |
| 2007/0130439 A1 | 6/2007 | Andersson et al. |
| 2007/0180230 A1 | 8/2007 | Cortez et al. |
| 2008/0075284 A1 | 3/2008 | Ellison et al. |
| 2008/0082828 A1 | 4/2008 | Jennings et al. |
| 2009/0031141 A1 | 1/2009 | Pearson et al. |
| 2009/0132830 A1 * | 5/2009 | Haga ....................... H04L 9/085 |
| | | 713/189 |
| 2009/0208003 A1 | 8/2009 | Matsukawa et al. |
| 2009/0293130 A1 | 11/2009 | Henry et al. |
| 2010/0048296 A1 | 2/2010 | Adiraju et al. |
| 2010/0161956 A1 | 6/2010 | Rasheed et al. |
| 2010/0185845 A1 | 7/2010 | Takayama et al. |
| 2010/0241852 A1 | 9/2010 | Sela et al. |
| 2011/0055585 A1 | 3/2011 | Lee |
| 2011/0219227 A1 | 9/2011 | Sharif et al. |
| 2012/0042157 A1 | 2/2012 | Leclercq |
| 2012/0210124 A1 | 8/2012 | Lieber |
| 2013/0042117 A1 | 2/2013 | Birtwhistle et al. |
| 2013/0070922 A1 | 3/2013 | Helms et al. |
| 2013/0073856 A1 | 3/2013 | Sherkin et al. |
| 2013/0159726 A1 | 6/2013 | McKeen et al. |
| 2014/0052989 A1 | 2/2014 | Jones et al. |
| 2014/0059356 A1 | 2/2014 | Nesnow et al. |
| 2014/0108786 A1 | 4/2014 | Kreft |
| 2014/0164776 A1 | 6/2014 | Hook et al. |
| 2014/0201540 A1 | 7/2014 | Li et al. |
| 2014/0281502 A1 | 9/2014 | Keung Chan et al. |
| 2014/0331064 A1 | 11/2014 | Ballesteros et al. |
| 2015/0113627 A1 * | 4/2015 | Curtis ..................... H04L 63/06 |
| | | 726/10 |
| 2015/0154031 A1 | 6/2015 | Lewis |
| 2015/0172052 A1 | 6/2015 | Genelle et al. |
| 2015/0186668 A1 | 7/2015 | Thomas et al. |
| 2015/0188703 A1 * | 7/2015 | Yu ......................... H04L 9/0869 |
| | | 380/46 |
| 2015/0350894 A1 * | 12/2015 | Brand ................. H04L 63/0435 |
| | | 380/270 |
| 2015/0358158 A1 | 12/2015 | Fadaie et al. |
| 2016/0105288 A1 | 4/2016 | Logue |
| 2016/0248585 A1 | 8/2016 | Itoh et al. |

OTHER PUBLICATIONS

U.S. Appl. No. 14/658,136 , "Non-Final Office Action", dated May 5, 2017, 13 pages.
U.S. Appl. No. 14/658,136 , "Updating Cryptographic Key Pair", U.S. Patent Application, filed Mar. 13, 2015.
U.S. Appl. No. 14/658,137 , "Non-Final Office Action", dated Sep. 21, 2016, 21 pages.
U.S. Appl. No. 14/658,137 , "Notice of Allowance", dated Feb. 16, 2017, 7 pages.
U.S. Appl. No. 14/658,137 , "Restriction Requirement", dated Jun. 8, 2016, 6 pages.
U.S. Appl. No. 14/658,137 , "Supplemental Notice of Allowance", dated Apr. 4, 2017, 2 pages.
U.S. Appl. No. 14/658,137 , "Updating Encrypted Cryptographic Key", U.S. Patent Application, filed Mar. 13, 2015.
U.S. Appl. No. 14/673,570 , "Controlling Digital Certificate Use", U.S. Patent Application, filed Mar. 30, 2015.
U.S. Appl. No. 14/673,585 , "Controlling Use of Encryption Keys", U.S. Patent Application, filed Mar. 30, 2015.

* cited by examiner

UPDATING ENCRYPTED CRYPTOGRAPHIC KEY

CROSS-REFERENCE TO RELATED APPLICATION

This application is a divisional of U.S. patent application Ser. No. 14/658,137, filed Mar. 13, 2015, entitled "UPDATING ENCRYPTED CRYPTOGRAPHIC KEY PAIR", issued as U.S. Pat. No. 9,674,162 on Jun. 6, 2017, which is related to U.S. patent application Ser. No. 14/574,299, filed Dec. 17, 2014, entitled "REDUCED OVERHEAD FOR CRYPTOGRAPHIC OPERATIONS," and U.S. patent application Ser. No. 14/658,136, filed Mar. 13, 2015, entitled "UPDATING CRYPTOGRAPHIC KEY PAIR", commonly owned and the contents of which are incorporated in their entirety by reference herein.

BACKGROUND

As an increasing amount of information is being transmitted and stored electronically, and as the number of transactions performed electronically through networks increases, there is an ever increasing need to protect sensitive information in an electronic environment. This includes not only securing the storing and transmitting of information, but also securing access to the information. A common approach is to encrypt information using an encryption algorithm or cipher to encode information such that the information can only be decrypted or otherwise interpreted using a cryptographic key.

An integrated circuit device often has device-specific information, such as device identification and cryptographic keys stored in on-chip fuses. These fuses can occupy a significant amount of die area. Moreover, the fuse programming or burning process tends to be time-consuming and can increase the manufacturing cost of the device. Therefore, it is desirable to reduce the on-chip storage of cryptographic information for a device.

BRIEF DESCRIPTION OF THE DRAWINGS

Various embodiments in accordance with the present disclosure will be described with reference to the drawings, in which.

DETAILED DESCRIPTION

Figure 1:
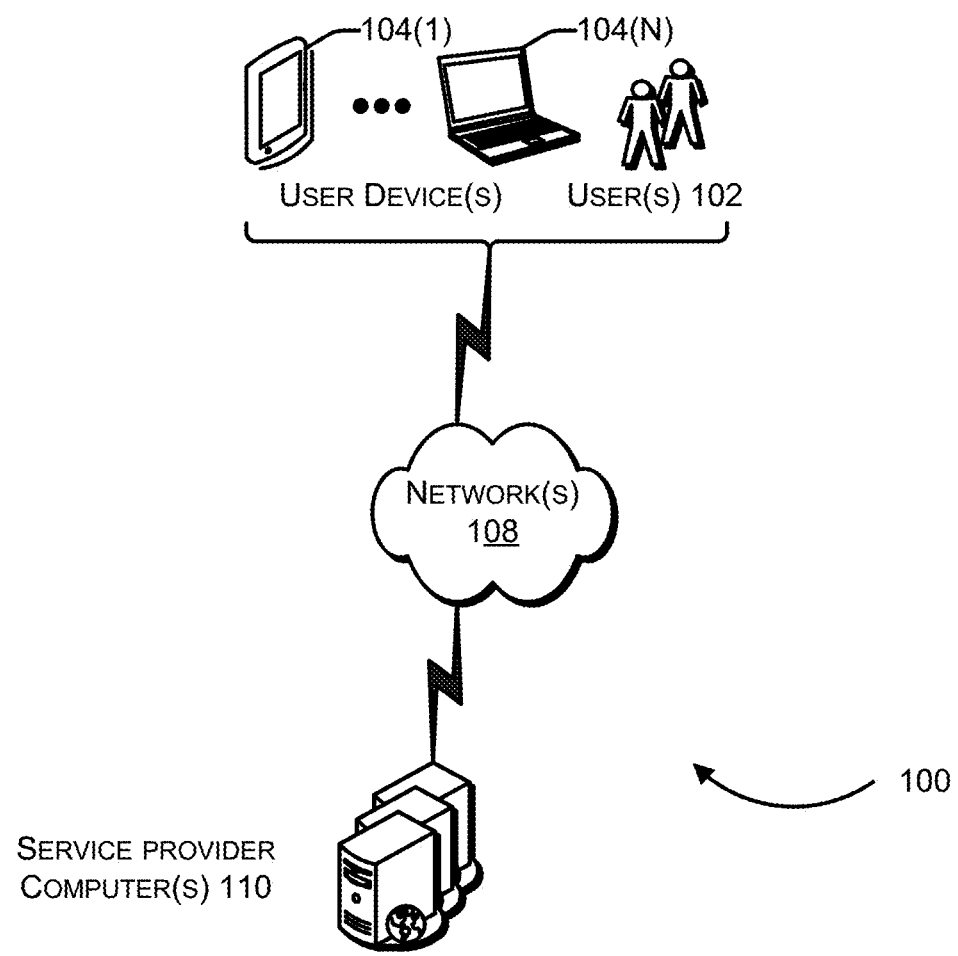
FIG. 1 illustrates an exemplary architecture for features and systems described herein that includes one or more service provider computers and/or a user device connected via one or more networks, according to at least one exemplary embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In a silicon product, secret keys are stored in fuses on the device. However, these fuses are costly from a silicon area point of view, and are often time-consuming to burn. In some devices, such as a processor or SoC (system-on-chip), each chip needs to have a private key, a public key, a signed certificate, and other device-specific information. To provide 128-bits of security for authentication using RSA (Rivest-Shamir-Adleman), a chip would need 3072 bits for the private key and over 1 kB (over 8000 bits) for the certificate. Thus, a total of 12,000 or more fuse bits would be necessary. Therefore, it is desirable to reduce on-chip fuse storage of security keys.

Embodiments of the disclosed technologies provide techniques for reducing the number of on-chip fuses without compromising the level of security. In some embodiments, the device fuses are used to store a randomly generated, device-specific, AES (Advanced Encryption Standard) key. This key would be used to encrypt the RSA private key generated for the device. The encrypted RSA private key can be stored along with a generated certificate (which contains the RSA public key for the device) in an external flash memory device. In some embodiments, device firmware reads a device specific AES key from the fuses, and uses the AES key to decrypt encrypted information retrieved from the flash memory.

This technique can reduce the number of fuse bits required to just the amount of space required to store the device-specific AES key, i.e., 128, 192 or 256 bits. In addition, this technique allows for the use of RSA, whereas the current trend is toward use of Elliptic Curve Cryptography (ECC) in part because of its reduced key size in comparison to RSA. This would allow RSA to be used in compute constrained environments where, for example, ECC is too time-consuming, specifically for public key operations. In addition, this technique also allows for the storage of the Chinese Remainder Theorem parameters for RSA, which can be used to greatly speed up RSA private key operations.

In embodiments of the disclosed technologies, a computing device has a memory for storing a first plurality of bits. The computing device is configured to derive a second plurality of bits using the first plurality of bits. The number of bits for the first plurality of bits is smaller than the number of bits for the second plurality of bits, and the second plurality of bits is used for performing at least one cryptographic operation. As an example, the first plurality of bits can be a symmetric key that can be stored in a first memory on the same integrated circuit (IC) chip as a processor. A second IC chip includes a second memory with an encrypted private key associated with an asymmetric cryptographic key pair. The private key is encrypted using the symmetric key. The processor is configured to read the encrypted private key from the second memory and decrypt the encrypted private key using the symmetric key. The processor is configured to use the private key for performing a cryptographic operation. Alternatively, the first plurality of bits can include a reduced set of information, e.g., one or more prime numbers, that can be used to generate cryptographic keys.

Under certain circumstances, it may become desirable to replace the cryptographic keys in a computing device after the device has been in operation. For example, the current key may have been compromised. Alternatively, certain preset limits may have been reached. For example, the number of cryptographic operations performed using the first private key may have reached a preset number, or the elapsed time of using the first private key reaching a preset limit. Embodiments of the disclosed technologies provide devices and methods for updating cryptographic keys in a computing device. In some embodiments, the computing device receives a replacement private key from a provisioning system, encrypts it, and stores the encrypted key in a memory to replace the current key. In some embodiments, the computing device generates a new private key using a different set of the prime numbers, and replaces the use of the current private key with the new private key for performing cryptographic operations.

FIG. 1 illustrates an exemplary architecture for features and systems described herein that includes one or more service provider computers and/or a user device connected via one or more networks, according to at least one exemplary embodiment. In architecture 100, one or more users 102 may utilize user computing devices 104(1)-(N) (collectively, user devices 104) to access applications provided by, e.g., a web browser or mobile device application, via one or more networks 108. In some aspects, these applications may be hosted, managed and/or provided by a computing resources service or service provider. One or more service provider computers 110 may provide a native application which is configured to run on user devices 104 which user(s) 102 may interact with.

As more information is being stored and more transactions are being executed electronically through various networks, there is an ever increasing need for secure storing and transmitting of sensitive information in an electronic environment. In addition, the devices connected to a network need to provide secure identity information and be authenticated by the network. A common approach is to encrypt information using an encryption algorithm or cipher to encode information such that the information can only be decrypted or otherwise interpreted using cryptographic keys.

Modern semiconductor integrated circuit computing devices, e.g., processors or SoCs, are often manufactured with device-specific information, such as device identification, stored in an on-chip non-volatile memory, also referred to as persistent memory, such that the secure data are retained when the device power is turned off. These device-specific data are often stored in fuses that are burnt in a later or final stage in device manufacturing. In security-sensitive applications where encryptions are desired, the information stored on-chip can include, for example, cryptographic keys and a digital certificate.

Depending on the cryptographic algorithm, the cryptographic keys can require thousands of fuses, which can occupy significant die area in an integrated circuit. Moreover, the fuse programming or burning process tends to be time-consuming and can increase the manufacturing cost of the device. Therefore, it is desirable to reduce the on-chip storage of cryptographic information for a device. Embodiments of the disclosed technologies include techniques for storing a reduced number of bits on the processor for performing cryptographic operations. According to some embodiments, two different cryptographic techniques are used to reduce the number of on-chip fuse bits in a device, as described in more detail below, with reference to FIG. 2.

In encryption, the message or information, referred to as plaintext, is encrypted using an encryption algorithm, generating a ciphertext, or encrypted message, that can only be read if decrypted. An encryption scheme usually uses a pseudo-random encryption key generated by an algorithm. An authorized recipient can easily decrypt the message with the key provided by the originator, but not unauthorized interceptors. In symmetric-key schemes, the encryption and decryption keys are the same. Thus, communicating parties must have the same key before they can achieve secret communication. On the other hand, in public-key encryption schemes, two keys are used: one for encryption and one for decryption. For example, a private encryption key can be used to encrypt messages, which can only be read by receiving parties in possession of a published decryption key. Alternatively, an encryption key can be published for multiple users to use and encrypt messages. However, only the receiving party has access to the decryption key that enables encrypted messages to be read.

Figure 2:
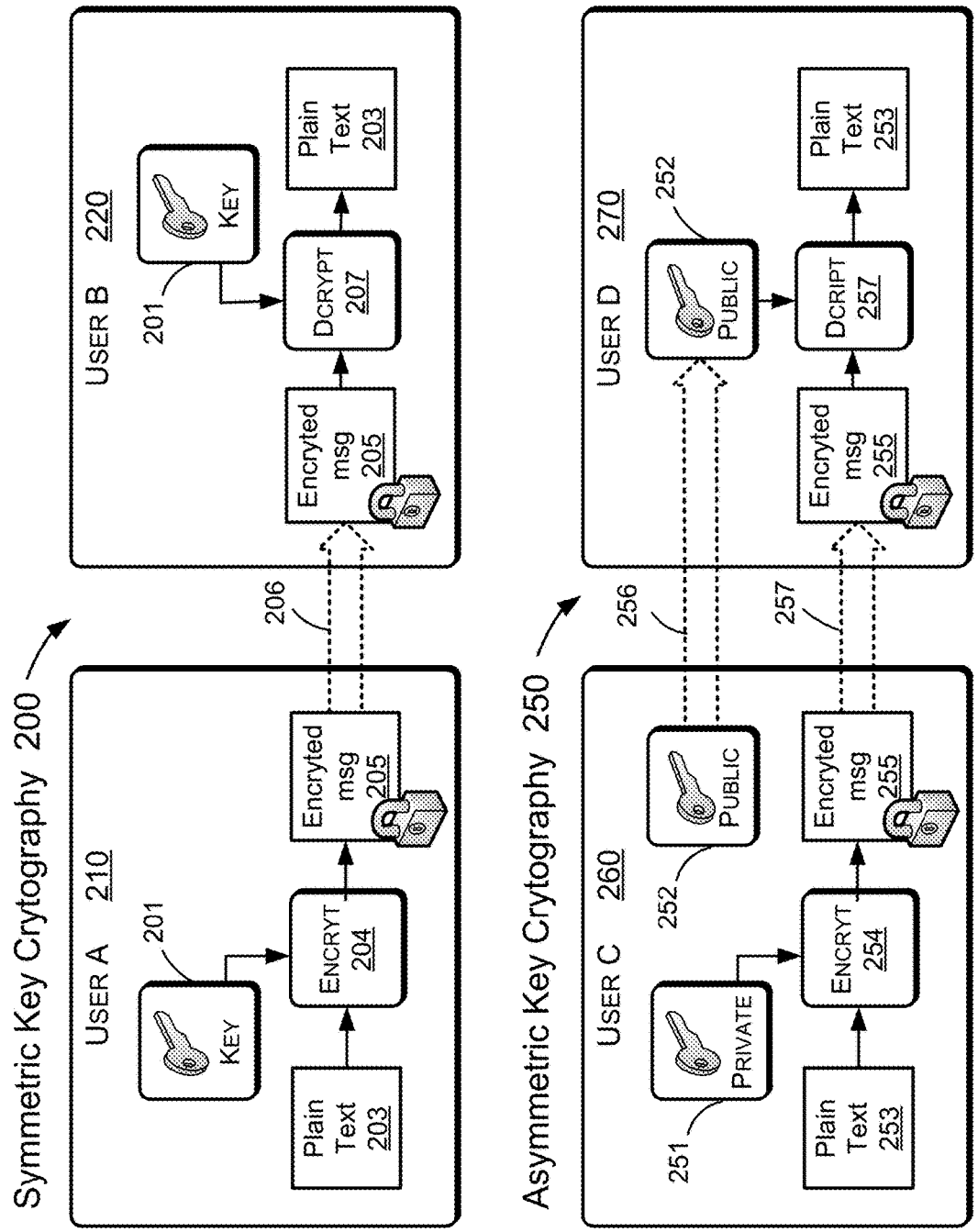
FIG. 2 illustrates cryptographic schemes using symmetric key and asymmetric keys according to one exemplary embodiment.

FIG. 2 illustrates cryptographic schemes using symmetric key and asymmetric keys, according to an exemplary embodiment. An example of symmetric key cryptography 200 is shown in FIG. 2, in which user A (210) and user B (220) both have the same secret key 201. In this example, user A (210) encrypts plain text 203 using key 201 in an encryption process 204 to generate encrypted message 205. User A (210) then sends encrypted message 205 to user B (220) using a transmission process 206. Upon receiving the encrypted message 205, user B decrypts it using the same key 201 in a decryption process 207 to obtain the plain text 203.

In FIG. 2, an example of asymmetric key cryptography is shown as 250, in which user C (260) has both a private key 251 and a public key 252. In this example, user C can send the public key 252 to user D (270) using a transmission process 256. User C (260) encrypts a plain text 253 using an encryption process 254 to generate an encrypted message 255. User C then sends encrypted message 255 to user D (270) using a transmission process 257. In some cases, transmission processes 256 and 257 can be the same process. Upon receiving the encrypted message 255, user D decrypts it using the public key 252 in a decryption process 257 to obtain the plain text 253.

There are many symmetric key cryptographic schemes. The Advanced Encryption Standard (AES) is a symmetric block cipher ratified as a standard by National Institute of Standards and Technology (NIST) of the United States. AES is based on the Rijndael cipher, which uses a design principle known as a substitution-permutation network, a combination of both substitution and permutation. The Rijndael specification is specified with block and key sizes that may be any multiple of 32 bits, both with a minimum of 128 and a maximum of 256 bits. The Rijndael algorithm involves several rounds of operation using round keys derived from the cipher key using Rijndael's key schedule. The operations can include substitution, transposition, and mixing, etc. As described above, the same key is used in encryption as well as decryption.

In contrast, in asymmetric key cryptography, different keys are used for encrypting and decrypting a message. In this case, one key can be made public while the other is kept secure. This arrangement is often referred to as public key cryptography, and provides some distinct advantages over symmetric encryption, for example, the necessity of distributing secret keys to large numbers of users is eliminated, and the algorithm can be used for authentication as well as for cryptography. RSA (Rivest-Shamir-Adleman) is a public-key cryptosystem widely used for secure data transmission. The algorithm is based on mathematical manipulation of two large prime numbers and their product. Its strength is believed to be related to the difficulty of factoring a very large prime number.

Figure 6:
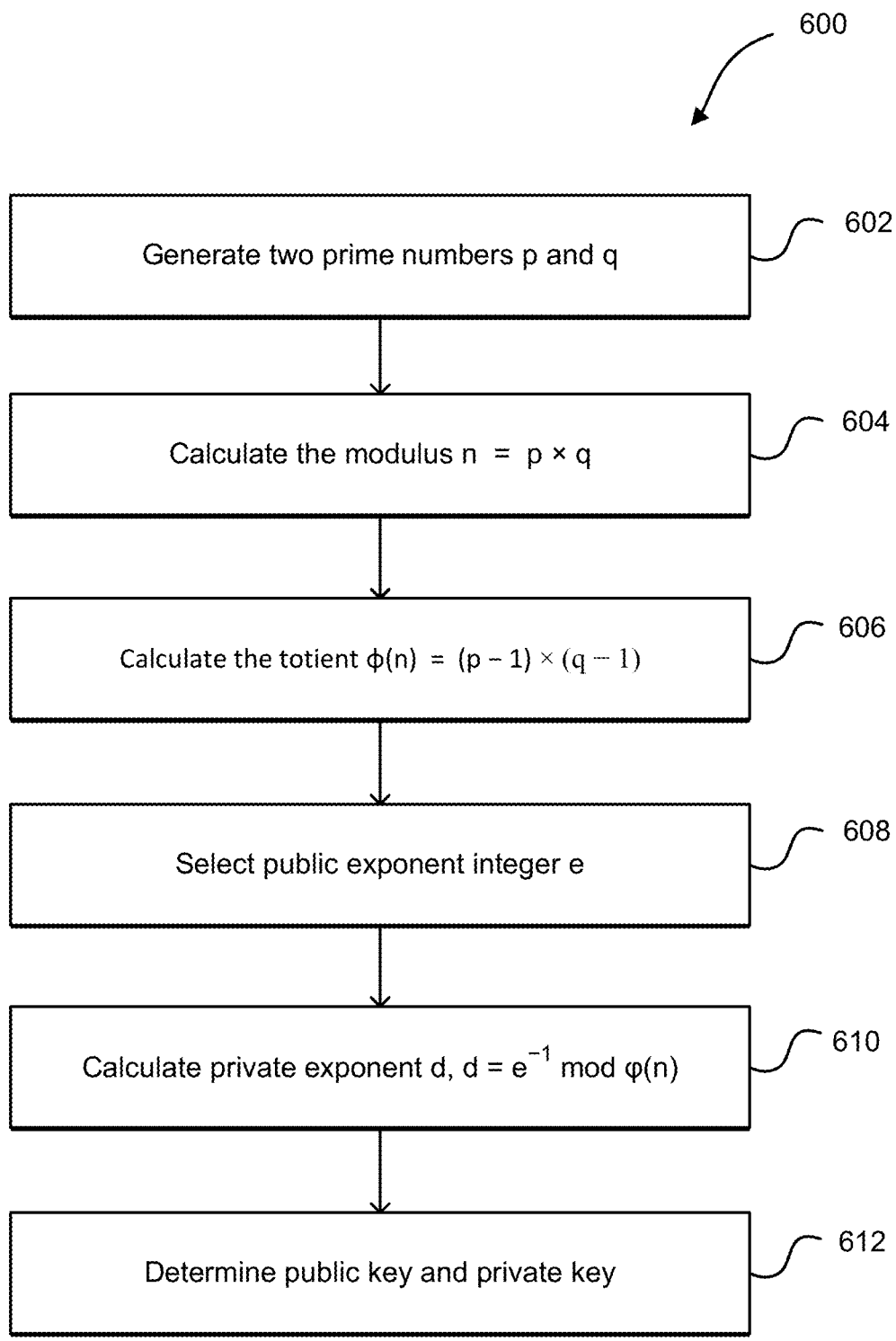
FIG. 6 is a flowchart illustrating a method for generating public/private keys from prime numbers according to one embodiment of the disclosed technologies.

A method for generating public and private keys will be described further below in connection with FIG. 6. In RSA, the public key consists of the modulus n and the public (or encryption) exponent e. The private key consists of the modulus n and the private (or decryption) exponent d, which is kept secret. The process is explained using an example of a public key holder sending an encrypted message to the private key holder. The encryption of a message M is formed by computation using the following formula, $$c \equiv m^e (\text{mod } n)$$

where m is an integer representation of the message M and $0 \leq m < n$, (n, e) is the public key, mod is a modulus function, and c is the ciphertext. The decryption of ciphertext c is carried out by computation according to the following formula, $$m \equiv c^d (\text{mod } n)$$

where d is the private key exponent. The decrypted integer representation m can be used to derive the original message M.

The security strength of the RSA scheme is related to its key size. It has been reported that to provide 128-bits of security for authentication using RSA, it would need to have 3072 bits for the private key and over 1 kB (over 8000 bits) for the certificate. Thus, a total of 12,000 or more bits would be necessary.

In the RSA algorithm, calculations are made modulo n, where n is a product of two large prime numbers p and q. 1,024-, 2,048- or 4,096-bit integers n are commonly used, making calculations very time-consuming. By using the Chinese remainder theorem, however, parts of the private key can be pre-computed and stored, and the private key calculations in the latter representation can be much faster.

Elliptic Curve Cryptography (ECC) is another public key scheme. In general, public-key cryptography is based on the intractability of certain mathematical problems. Early public-key systems, such as RSA, are secure assuming that it is difficult to factor a large integer composed of two or more large prime factors. For elliptic-curve-based protocols, it is assumed that finding the discrete logarithm of a random elliptic curve element with respect to a publicly known base point is infeasible. The security of ECC depends on the ability to compute a point multiplication and the inability to compute the multiplicand given the original and product points. The size of the elliptic curve determines the difficulty of the problem. The benefits offered by ECC are a smaller key size, reducing storage, and transmission requirements. For example, an elliptic curve group could provide the same level of security afforded by an RSA-based system with a large modulus and correspondingly larger key. For example, a 256-bit ECC public key has been reported to provide comparable security to a 3072-bit RSA public key. ECC can also offer faster private key operations, but public key operations can be slower than equivalent strength RSA.

Besides encryption, in secure communications, a digital certificate is often used. For example, when sending out encrypted data, the sender often sends a digital certificate to distribute a public key. In connecting to a network, a device needs to provide a certificate to the network such that the network can authenticate the device. A digital certificate is a collection of data used to verify the identity of the holder or sender of the certificate. In some schemes, a digital certificate can contain a digital signature from a certification authority (CA), which is a person or organization that issued the certificate, and information about the certificate holder, for example, name, email address, company name, the owner's public key, etc.

As described earlier, it is desirable to reduce on-chip fuse storage of security keys. Embodiments of the disclosed technologies provide techniques for reducing the number of on-chip fuses without comprising the level of security. In some embodiments, the device fuses are used to store a randomly generated, device-specific, AES key. This key would be used to encrypt the RSA private key generated for the device. The encrypted RSA private key can be stored along with a generated certificate (which contains the RSA public key for the device) in an external flash memory device. Once this is done, the generated AES key can be forgotten by the party provisioning the device. In some embodiments, when the device firmware boots, the firmware reads the device-specific AES key from the fuses, and uses the AES key to decrypt encrypted info retrieved from the flash memory. In another embodiment, the AES key is never exposed outside the silicon (e.g., the processor or SoC). For example, the encrypted RSA private key may be loaded into the level 1 cache in non-eviction mode, where the RSA private key may be decrypted using the AES key from the fuses, without ever exposing the AES key or the decrypted private key to memory or instructions external to the processor or the SoC. Safeguarding the AES key and the decrypted private key such that they are never exposed to the environment outside the silicon die results in an implementation with security properties similar to the case where the private key is stored in fuses inside the processor or SoC itself.

This technique reduces the number of fuse bits required to just the amount of space required to store the device-specific AES key, i.e., 128, 192 or 256 bits. In addition, this technique allows for the use of RSA, whereas current trend is toward use of Elliptic Curve Cryptography (ECC) in part because of its reduced key size in comparison to RSA. This would, for example, allow RSA to be used in compute-constrained environments where ECC is too time-consuming, specifically for public key operations. In addition, this technique also allows for the storage of the Chinese Remainder Theorem parameters for RSA, which can be used to greatly speed up RSA private key operations.

Figure 3:
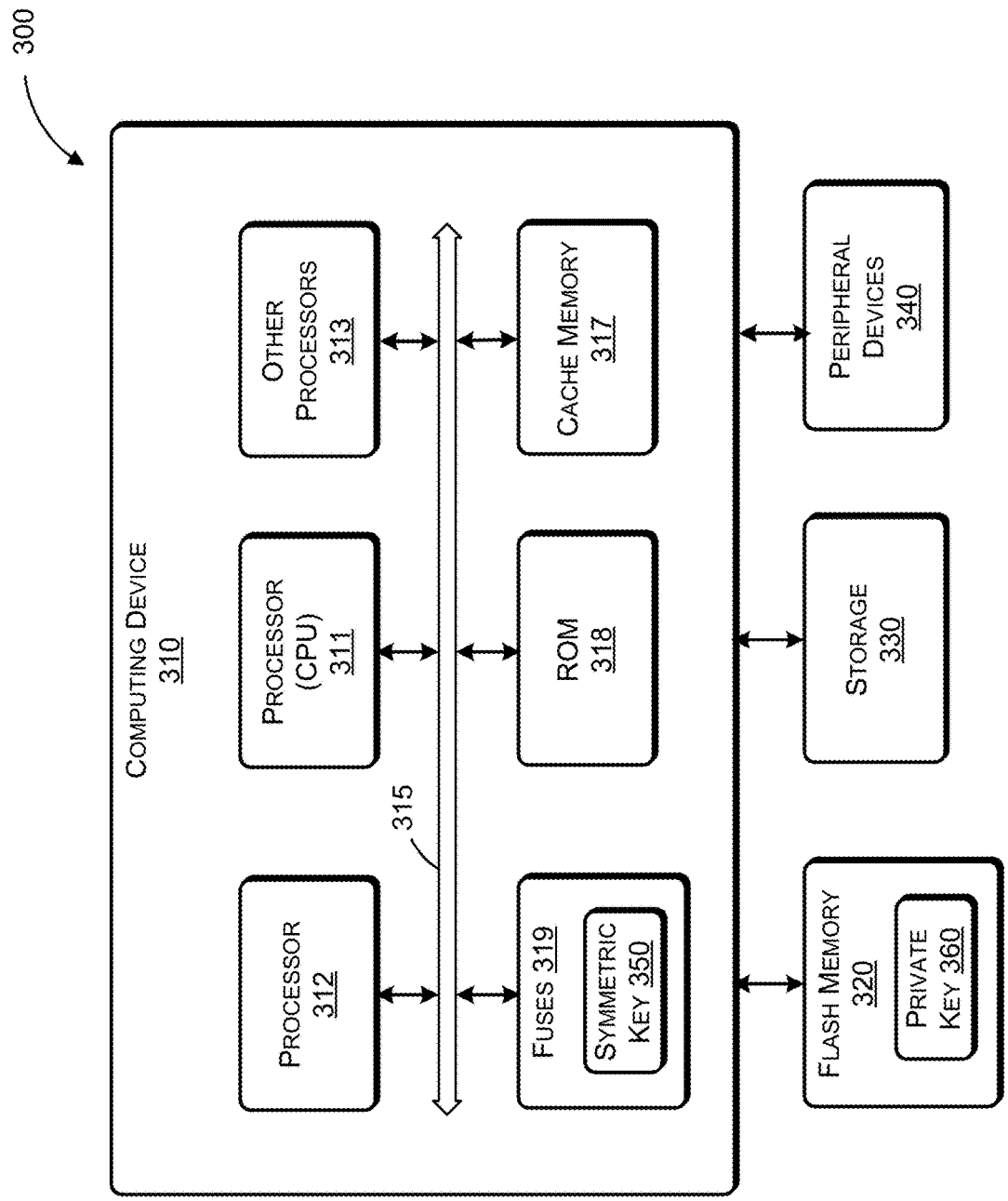
FIG. 3 illustrates a computing device including a security processor according to one embodiment of the disclosed technologies.

FIG. 3 shows a system 300 including a security processor according to one embodiment of the disclosed technologies. However, one skilled in the relevant art will appreciate that the disclosed illustrative components are not meant to be an exhaustive identification of all the components required by, or present in, a system 300. Rather, illustrative components have been identified, in a non-limiting manner, to facilitate illustration of one or more aspects of the disclosed technologies. Still further, the illustrative components of system 300 can be considered logical in nature such that the physical implementation of one or more components can be varied or such that one or more of the logical components may be implemented in a virtualized manner. Additionally, one or more computing devices can share one or more of the illustrated components, such as processors, graphical processing units, memory, and the like.

In an illustrative embodiment, system 300 is associated with various hardware components, software components, and respective configurations that facilitate the implementation of security functions. For example, in one embodiment, system 300 can include a computing device 310, e.g., a system-on-chip (SoC), built in a single integrated circuit (IC) chip, for carrying out the operation of computing device 300. As shown in FIG. 3, computing device 310 can have a processor (CPU) 311, a second processor 312, and other processors 313, all coupled to a communication channel 315. In some embodiments, second processor 312 can be configured to perform security-related functions, including encryption and decryption according to various algorithms. It is noted that in embodiments of the disclosed technologies, a security processor is optional, as security-related functions can be implemented by other means, for example, by computer code executed by one or more processors, by hardware, or combinations thereof. Computing device 310 can also have various memory units, such as cache memory 317, ROM (read-only memory) 318, and fuses 319, also disposed on the same IC chip. In addition, computing device 300 can have multiple peripheral devices, such as flash memory 320 on a separate IC chip, other non-volatile storage devices 330, and other peripheral devices 340. In some embodiments, processor or computing device 310 and flash memory 320 are separate IC chips disposed on the same system circuit board. The peripheral devices can include an external communication interface for establishing communication channels between the computing device and one or more network based services or other computing devices. In some embodiments, the peripheral devices may be implemented using multiple discrete hardware elements, such as multiple cards or other devices.

In FIG. 3, ROM 318, fuses 319, and flash memory 320 are examples of non-volatile, or persistent, memories. ROMs or mask ROMs are factory programmable (e.g., can be programmed during fabrication), and typically are used for large-volume products not required to be updated after manufacture. For example, a boot ROM can include or locate boot loader software utilized to boot system 300. In an embodiment, the ROM can include System Basic Input/Output System (SBIOS), which can include executable code, often referred to as firmware, that can be executed by one or more processors and used to cause components of system 300 to initialize and identify system devices such as the video display card, keyboard, mouse, hard disk drive, optical disc drive, and other hardware.

Another type of non-volatile memory, programmable read-only memory (PROM), can be altered after manufacture, but requires special programmer equipment, and data is stored by physically altering (burning) storage sites in the device. Yet another type of non-volatile memory, an electrically erasable programmable read-only memory EEPROM, can be erased and programmed in-system. In FIG. 3, flash memory 320 may include flash memory chips, which are a type of EEPROM that can only erase one block or "page" at a time. It is a solid-state chip that maintains stored data without any external power source. Flash memory devices can offer high capacity and reasonable read/write speed, and mass production has lowered the cost of these commodity storage devices, making these chips a popular choice as secondary storage chips for processors.

Permanent device-specific information is often stored in a programmable read only memory (PROM) that can be programmed at a final test stage or in the system. Fuse-based PROMs can be programmed by electrically melting conductive traces made of a metal or polysilicon material (blowing microscopic fuses) to cause a conductive path to be broken. Alternatively, some PROMs operate by sending a current to change the electrical resistance of a material disposed between two conductors.

System 300 can also include additional components that are in communication with one or more of the illustrative components associated with system 300. Such components can include one or more controllers in combination with one or more peripheral devices 340, such as hard disks or other storage devices.

According to some embodiments of the disclosed technologies, a device includes a processor and a first memory with a symmetric key stored therein. For example, the device can be a system-on-chip, and the first memory can be a fuse-based memory. The symmetric key is associated with a symmetric cryptographic scheme. The processor is configured to load encrypted data that can include a private key into a processor cache from a second memory. The second memory can be an electrically erasable programmable non-volatile memory. The private key is associated with an asymmetric cryptographic key pair. The processor is further configured to decrypt the encrypted private key in the processor cache using the symmetric key for performing cryptographic operations. An embodiment of this computing device can be implemented using the system 300 in FIG. 3, as follows. Computing device 310, e.g., an SoC, can constitute a first integrated circuit (IC) chip with a processor 311 and fuses 320 that store a symmetric key 350. Symmetric key 350 is associated with a symmetric cryptographic scheme, for example, RSA. Flash memory 320 can constitute a second IC chip that can be used to store at least an encrypted private key associated with an asymmetric cryptographic key pair. The private key is encrypted using the symmetric key stored in fuses 319.

Figure 4:
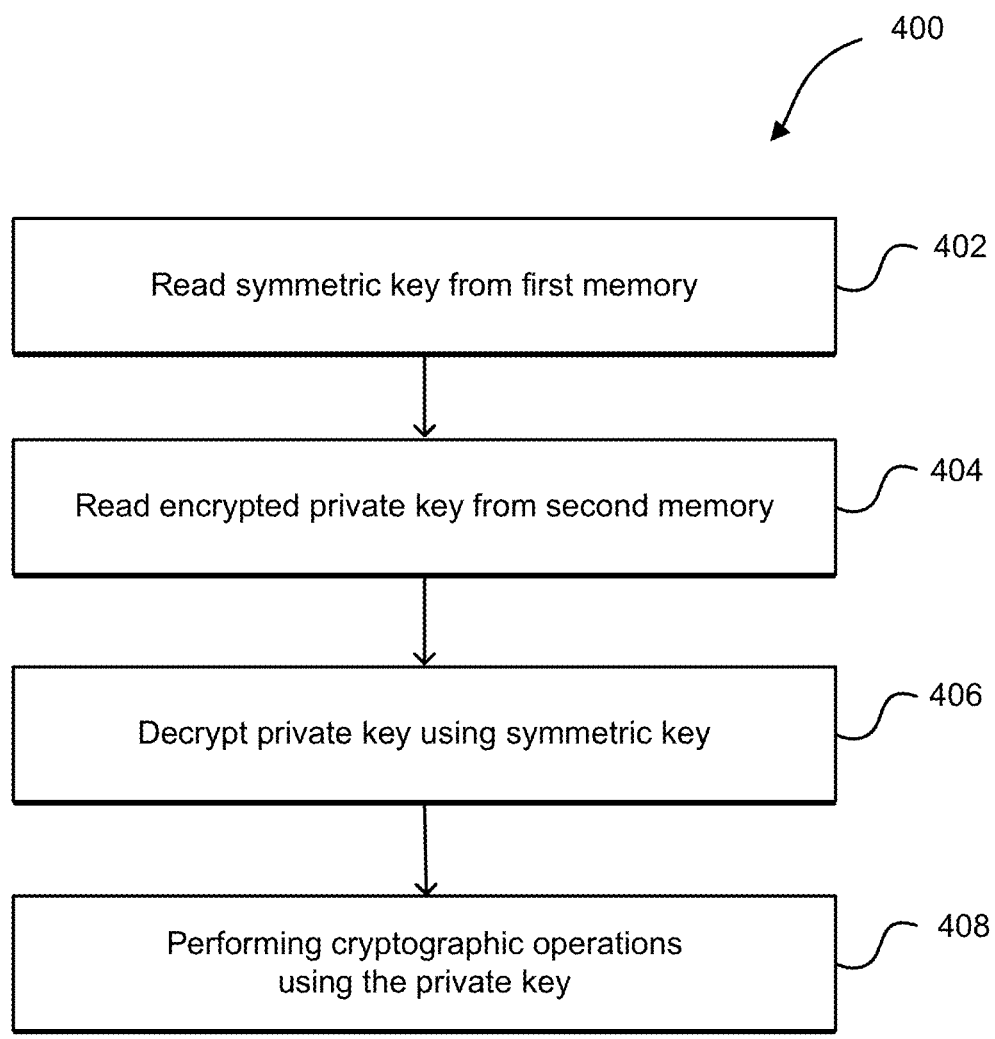
FIG. 4 is a flowchart illustrating a method for performing cryptographic operation according to one embodiment of the disclosed technologies.

In this embodiment, one of the processors in FIG. 3 can be configured to perform the following processes, as illustrated by the flowchart in FIG. 4.

Process 402: Read a symmetric key from first memory;
Process 404: Read an encrypted private key from second memory;

Process 406: Decrypt the private key using the symmetric key; and

Process 408: Perform cryptographic operations using the private key.

In an embodiment, method 400 illustrated in the flowchart in FIG. 4 can be implemented using the computing device shown in FIG. 3. For example, in process 402, processor 312 can be configured to read a symmetric key 350 from a first memory, such as fuses 319. The symmetric key is associated with a symmetric cryptographic scheme. In an embodiment, symmetric key 350 can be an AES key. In process 404, processor 312 is configured to read encrypted private key 360 from a second memory, such as flash memory 320. Encrypted private key 360 can be a private key associated with an asymmetric cryptographic scheme, such as RSA, that has been encrypted using the symmetric key. Encrypted private key 360 can be read into processor cache memory 317, where the encrypted private key can be decrypted using the symmetric key, as shown in process 406. In process 408, processor 312 is configured to perform cryptographic operations using the decrypted private key. Here, cryptographic operations can include device authentication and data encryption and decryption, etc.

In some embodiments, the flash memory can also be used to store other encrypted information. For example, a digital certificate can be encrypted by the symmetric key and stored in the flash memory. In another example where RSA algorithms are used, parameters for the Chinese Remainder Theorem can be encrypted and stored in the flash memory, which can be used to speed up RSA private key operations.

According to some embodiments of the disclosed technologies, a computing device has a memory for storing a first plurality of bits. The computing device is configured to derive a second plurality of bits using the first plurality of bits. The number of bits for the first plurality of bits is smaller than the number of bits for the second plurality of bits, and the second plurality of bits is used for performing at least one cryptographic operation. Depending on the embodiments, the first plurality of bits can include a reduced set of information that can be used in cryptographic operations. In another example, one or more prime numbers can be stored in the first memory in the same integrated circuit (IC) chip as a processor, as described further below in connection with FIGS. 5-7. As another example, a symmetric key is stored in a first memory in the same (IC) chip as the processor. This embodiment can be implemented using system 300 in FIG. 3, as follows. Computing device 310, e.g., an SOC, stores a plurality of bits in fuses 319, and computing device 310 is configured to derive a second plurality of bits using the first plurality of bits stored on the processor. The number of bits for the first plurality of bits is smaller than the number of bits for the second plurality of bits, and the second plurality of bits is used for performing at least one cryptographic operation.

In an embodiment of the device, the first plurality of bits can represent a symmetric key and the second plurality of bits can represent a private key associated with an asymmetric cryptography key-pair. In an embodiment, the first plurality of bits represent a symmetric key and the second plurality of bits represent an asymmetric cryptography key-pair generated by the processor using the symmetric key. In this embodiment, processor 312 in FIG. 3 can be used for key generation.

In an embodiment, the private key can be derived by decrypting a third plurality of bits stored in a memory coupled to the processor, e.g., flash memory 320 in FIG. 3, using the symmetric key. In this embodiment, the device is configured to perform the processes illustrated in FIG. 4 described above. In a specific embodiment, the symmetric key can be an advanced encryption standard (AES) key.

In an embodiment, the first plurality of bits are used in deriving a private key associated with an asymmetric cryptography key-pair. In an embodiment, the first plurality of bits can include one or more safe prime numbers. The number of bits for the first plurality of bits is less than the number of bits for the private key.

In an embodiment, the first plurality of bits are unique amongst the first plurality of bits stored on a set of other computing devices, or possibly among all other computer devices. For example, in embodiments of the disclosed technologies, the random number or the symmetric key is probabilistically not the same in any two computing devices. In an embodiment, the first plurality of bits are not accessible to any entity outside the computing device.

Figure 5:
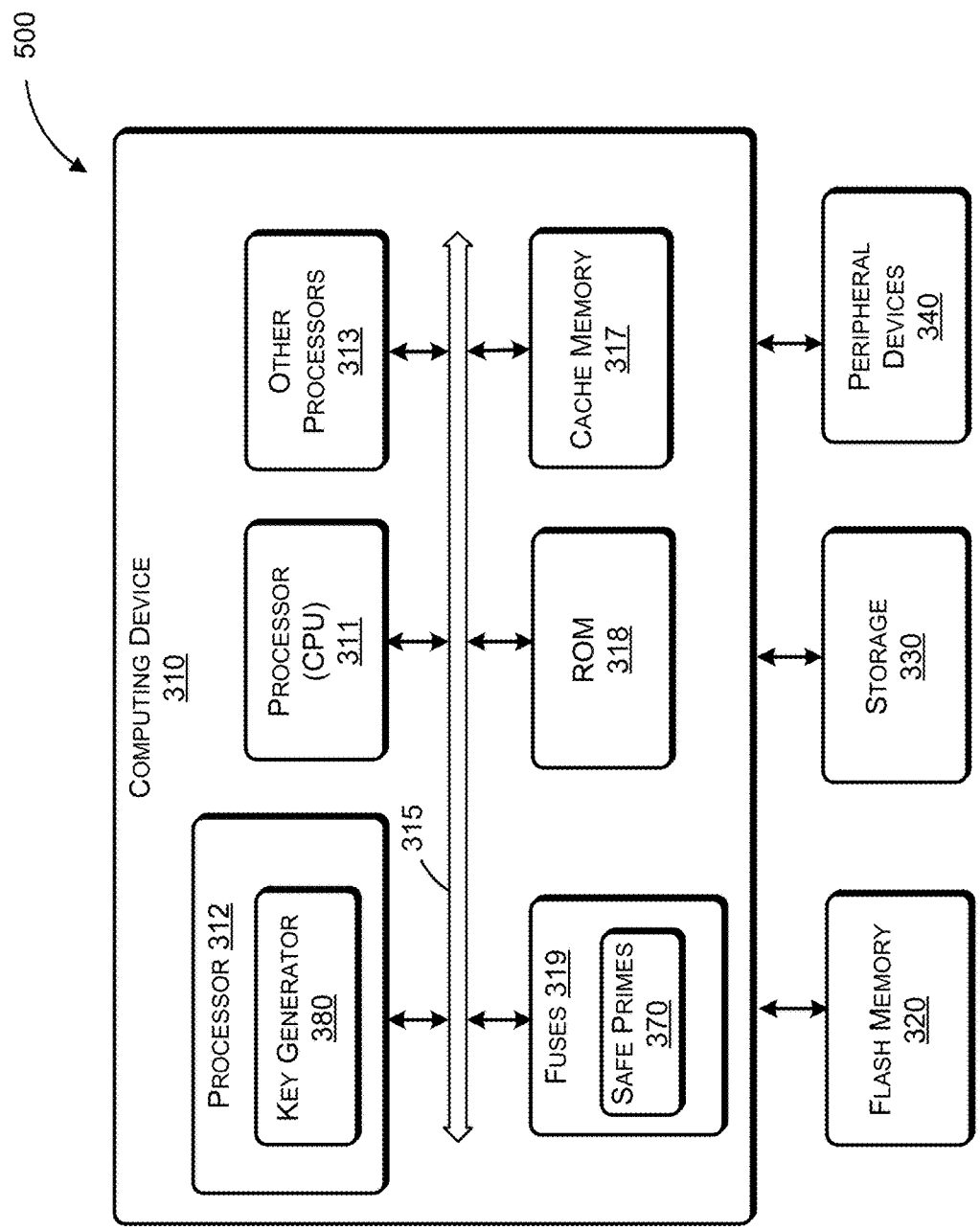
FIG. 5 illustrates a computing device including an encryption key generator according to one embodiment of the disclosed technologies.

FIG. 5 illustrates a system 500 which includes an encryption key generator according to another embodiment of the disclosed technologies. System 500 has similar components as system 300 illustrated in FIG. 3. However, in this embodiment, security processor 312 in computing device 500 includes a cryptographic key generator 380. It is noted that security processor 312 and cryptographic key generator 380 are included in FIG. 5 for convenience of illustration. In embodiments of the disclosed technologies, use of a separate security processor is optional. Security related functions can be implemented by other means, for example, by computer code executed by one or more processors, by hardware, or combinations thereof. Further, system 500 has a reduced set of information 370 associated with a private key stored in a persistent memory, for example, in fuses 319. For example, the reduced set of information 370 can be two safe prime numbers suitable for generating a private key in an RSA cryptographic scheme. In this example, safe prime numbers 370 are provisioned in fuses 319 during the manufacturing of computing device 310. During operation, key generator 380 is configured to access the safe prime numbers 370 in fuses 319, and use the prime numbers to generate public and private keys for RSA cryptography.

As described above, computing device 310 illustrated in FIG. 5 can be configured to access the safe prime numbers 370 in fuses 319, and use the prime numbers to generate public and private keys for RSA cryptography. FIG. 6 is a flowchart illustrating a method 600 for generating public/private keys from prime numbers according to one embodiment of the disclosed technologies. The computational processes for key generation include the following.

Process 602: Generate two different prime numbers, p and q;

Process 604: Calculate the modulus n=p×q;

Process 606: Calculate the totient $\varphi(n)=(p-1)\times(q-1)$;

Process 608: Select for public exponent an integer e such that $1<e<\varphi(n)$ and $\gcd(\varphi(n), e)=1$;

Process 610: Calculate for the private exponent a value for d such that $d=e^{-1} \bmod \varphi(n)$; and Process 612: Determine Public Key=[e, n] and Private Key=[d, n].

Method 600 summarized above is an example of generating RSA key pairs using prime numbers stored in a persistent memory of the computing device. Details of the RSA algorithm have been described publicly. For example, in process 602, prime numbers p and q are chosen at random and preferably have similar bit-length. Prime numbers can be found using conventional primality tests. In process 606, totient $\varphi(n)$ is an arithmetic function that counts the positive integers less than or equal to n that are relatively prime to n.

In process 608, the integer e is the public key exponent, and e and φ(n) are coprime. In process 610, d is the multiplicative inverse of e mod φ(n), and d is the private key exponent. In process 612, the public key consists of the modulus n and the public encryption exponent e. The private key consists of the modulus n and the private decryption exponent d. The private key and public key are used in encryption and decryption as described above The prime numbers are just an example of a reduced set of information associated with the private key that can be stored on the processor using a persistent memory, such as secure fuses. Depending on the cryptographic scheme, other reduced set of information can also be used as described below in connection with FIG. 7.

Figure 7:
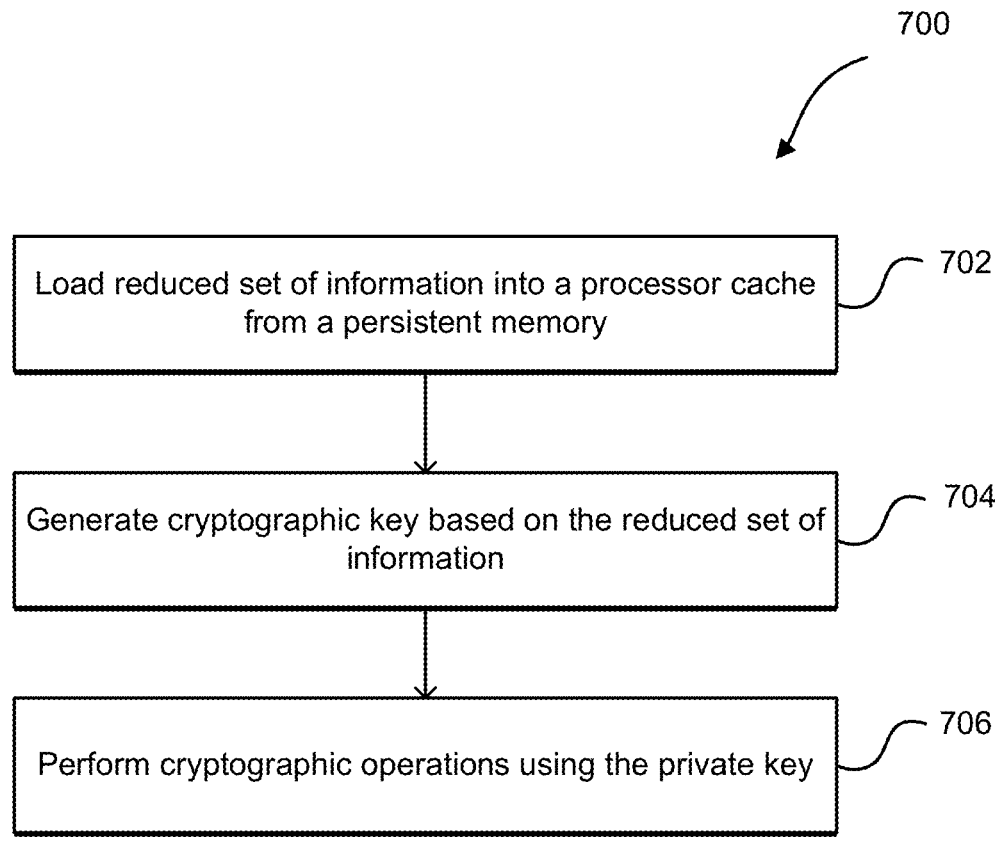
FIG. 7 is a flowchart illustrating another method for performing cryptographic operation according to one embodiment of the disclosed technologies.

FIG. 7 is a flowchart illustrating a method 700 for performing cryptographic operation according to one embodiment of the disclosed technologies. In this embodiment, the method includes the following processes.

Process 702: Load reduced set of information into a processor cache from a persistent memory;
Process 704: Generate a cryptographic key based on the reduced set of information; and
Process 706: Performing cryptographic operations using the private key.

Method 700 can also be implemented using system 500 in FIG. 5. In process 702, the reduced set of information can include the prime numbers described above in connection with FIG. 5. For example, fuses 319 can be used to store safe prime numbers that are used to generate keys for RSA cryptography, as described above, in process 704. In some embodiments, other reduced sets of information can be used for other cryptographic methods. For example, parameters for elliptic curve cryptography (ECC) can be stored in the persistent memory, and then used to generate an ECC public key. In this case, the reduced set of information referred to in process 702 can include the elliptic curve specification and a prime number. In these examples, the reduced set of information has a first plurality of bits stored on the computing device. In process 704, the computing device is configured to derive a cryptographic key, which is represented by a second plurality of bits, using the first plurality of bits. The number of bits for the first plurality of bits is smaller than the number of bits for the second plurality of bits. Therefore, with the smaller persistent memory, the die size and the programming time can be reduced.

Figure 8:
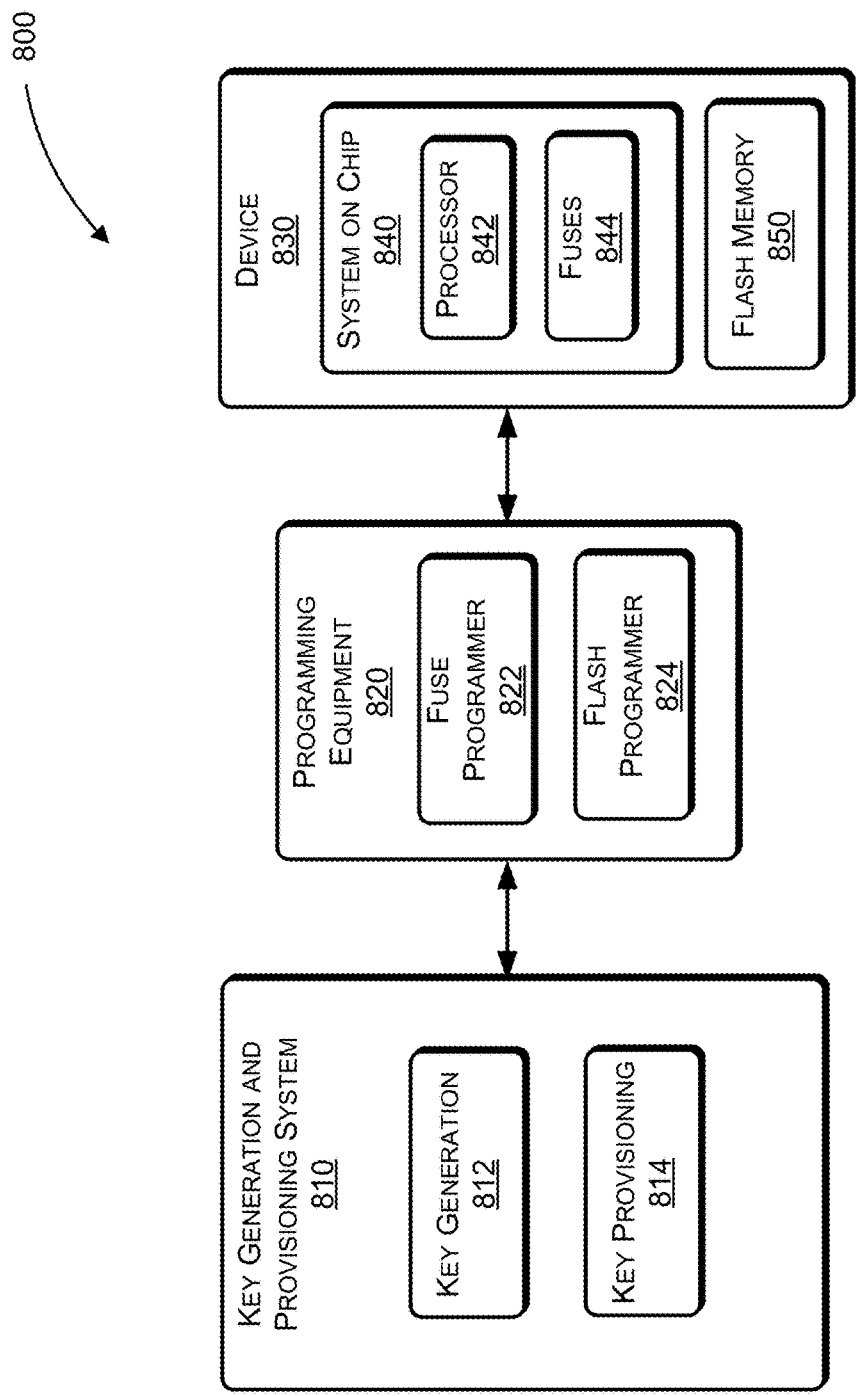
FIG. 8 illustrates an encryption key provisioning system according to one embodiment of the disclosed technologies.

FIG. 8 illustrates a cryptographic key provisioning system according to one embodiment of the disclosed technologies. In FIG. 8, key provisioning system 800 includes a key generation and provisioning system 810, a programming equipment 820, and a device 830 for receiving key provisioning. Key generation and provisioning system 810 can include a key generation unit 812, which is configured to generate keys for symmetric and asymmetric cryptography using known methods. Key generation and provisioning system 810 can also include a key provisioning unit 814, which is configured to manage key provisioning activities. In some embodiments, programming equipment 820 can include a fuse programmer 822 and a flash programmer 824, which are used to program the keys generated by the key generation and provisioning system 810 into device 830. In some embodiments, device 830 can include a computing device or system-on-chip 840, which can have a processor 842 and fuses block 844. Device 830 can also have a flash memory 850 disposed in a second IC chip. For example, device 830 can represent system 300 in FIG. 3 or system 500 in FIG. 5. Key provisioning system 800 can be configured to implement the various embodiments described above.

Figure 9:
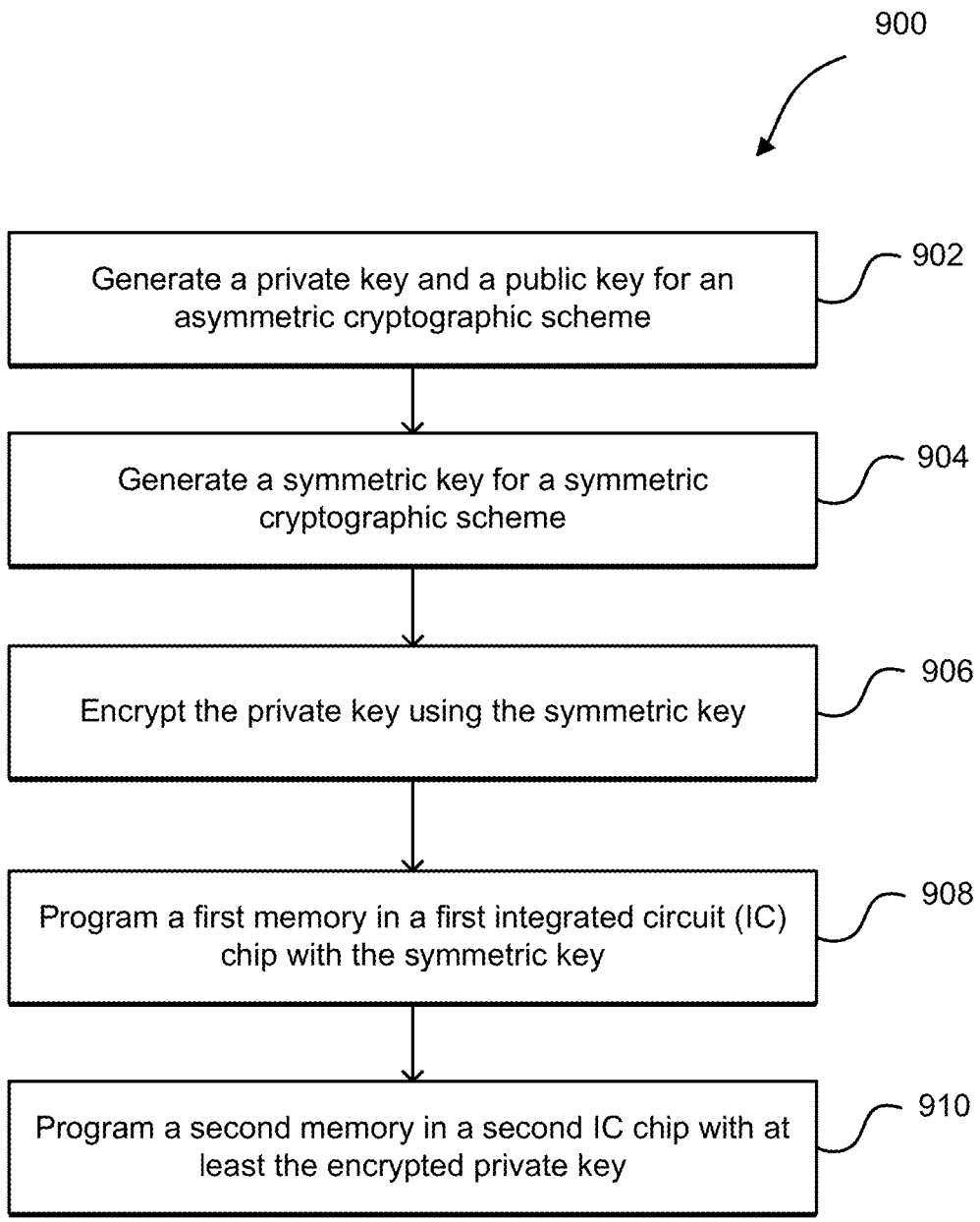
FIG. 9 is a flowchart illustrating a method for key provisioning according to one embodiment of the disclosed technologies.

According to some embodiment of the disclosed technologies, a method 900 for encryption key provisioning using a key provisioning system includes the following processes, as summarized in the flowchart illustrated in FIG. 9.

Process 902: Generate a private key and a public key for an asymmetric cryptographic scheme;
Process 904: Generate a symmetric key for a symmetric cryptographic scheme;
Process 906: Encrypt at least the private key using the symmetric key to obtain an encrypted private key;
Process 908: Program a first memory with the symmetric key;
Process 910: Program a second memory with at least the encrypted private key.

In an embodiment, the key provisioning method can be implemented using the key provisioning system 800 illustrated in FIG. 8. For example, in process 902, key provisioning system 800 is configured to generate a private key and a public key for an asymmetric cryptographic scheme, e.g., RSA, using known methods. In process 904, key provisioning system 800 is configured to generate a symmetric key for a symmetric cryptographic scheme, e.g., AES. In process 906, key provisioning system 800 is configured to encrypt at least the private key using the symmetric key to obtain an encrypted private key. In some cases, other information can also be encrypted, such as a digital certificate. In process 908, key provisioning system 800 programs the symmetric key into a first memory, and in process 910, key provisioning system 800 programs at least the encrypted private key into a second memory. In some embodiments, as in device 830 receiving provisioning described above, the first memory can include fuses in a first integrated circuit (IC) chip and the second memory can include a flash memory, or other electrically erasable programmable non-volatile memory, in a second IC chip. In some embodiments, the first IC chip can be a computing device, e.g., SoC, and the electrically erasable programmable non-volatile memory can reside in a second IC chip separate from the computer device. In alternative embodiments, the electrically erasable programmable non-volatile memory can reside in the same IC chip as the computer device.

In embodiments of the key provisioning method 900 described above, the information being encrypted and programmed can include information other than cryptographic keys. For example, method 900 can also include generating a digital certificate, encrypting the digital certificate using the symmetric key, and programming the second memory with the digital certificate. In some embodiments, the method can also include encrypting parameters for the Chinese Remainder Theorem (CRT) for an RSA (Rivest-Shamir-Adleman) asymmetric key encryption scheme and programming the second memory with the encrypted parameters. These parameters can be used by the processor to speed up the key generation process. In addition, for the device and method described above in connection with FIGS. 5-7, key provisioning system 800 can be configured to generate prime numbers and program the prime numbers into the first memory, which can be a persistent memory on the same IC chip as the computing device. The computing device can then generate cryptographic keys using the prime numbers. In alternative embodiments, key provisioning system 800 can be configured to provide a reduced set of information and program the information into the first memory. The computing device can then generate cryptographic keys using the reduced set of information. For example, method 900 can include generating parameters for elliptic curve cryptography (ECC), e.g., elliptic curve specification and a prime number, and store this information in the persistent memory, which can be used by the processor to generate an ECC public key.

The processes described herein, or variations and/or combinations thereof, may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 10:
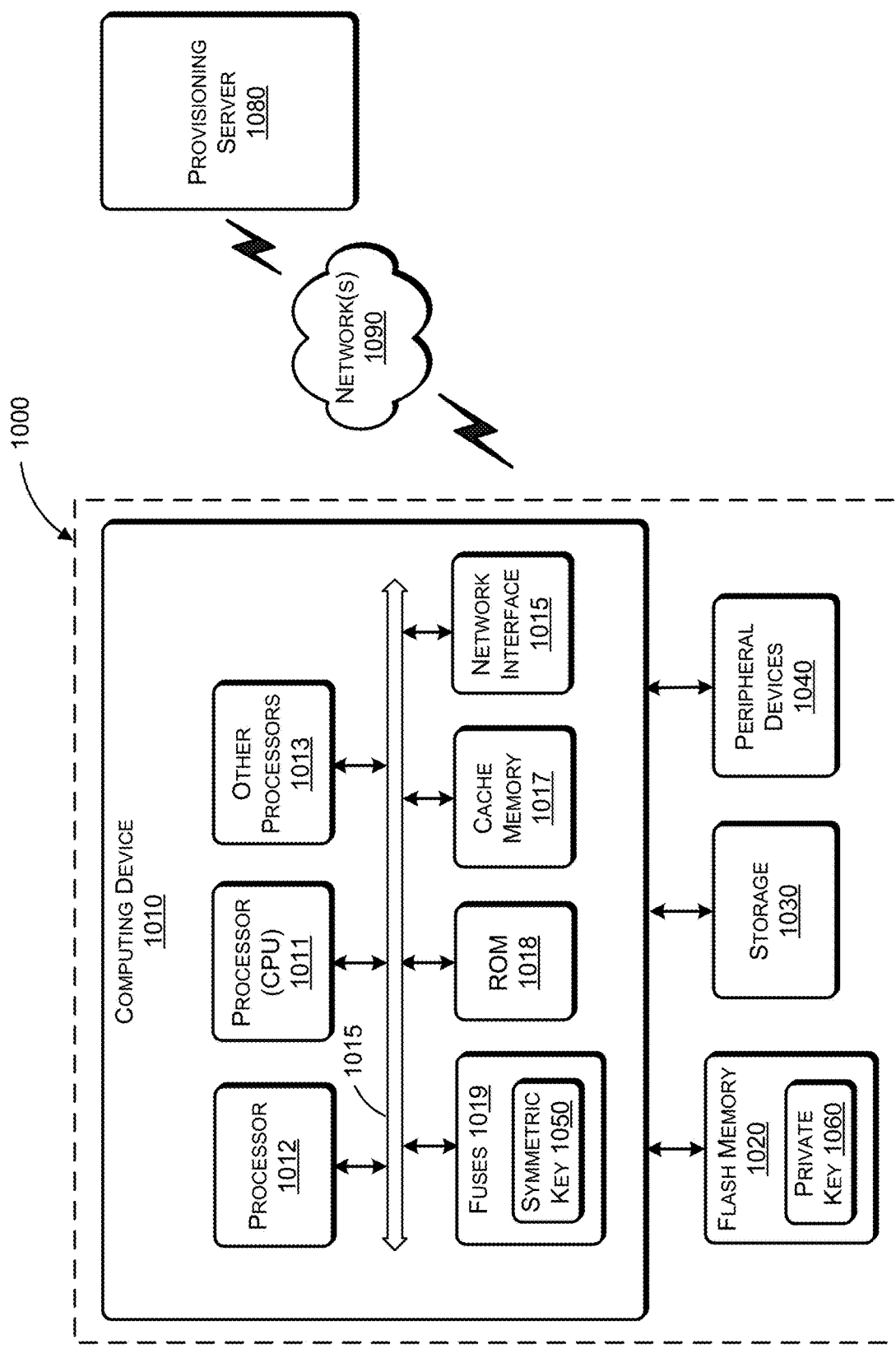
FIG. 10 illustrates a computing device including a security processor according to one embodiment of the disclosed technologies.

FIG. 10 illustrates a computing device that allows for cryptographic key updating according to one embodiment of the disclosed technologies. In an illustrative embodiment, system 1000 has similar components as system 300 illustrated in FIG. 3, for example, various hardware components, software components, and respective configurations that facilitate the implementation of security functions. However, system 1000 has additional features for updating cryptographic keys, as described below.

Similar to system 300, system 1000 can include a computing device 1010, e.g., a system-on-chip (SoC), built in a single integrated circuit (IC) chip. Computing device 1010 can have processors 1011-1013, all coupled to a communication channel 1015. In some embodiments, processor 1011 can be a CPU, and processor 1011 and/or processor 1012 can be configured to perform security related functions, including encryption and decryption according to various algorithms. Computing device 1010 can also have various memory units, such as cache memory 1017, ROM (read-only memory) 1018, and fuse-based memory 1019, also disposed on the same IC chip. In addition, system 1000 can have multiple peripheral devices, such as electrically erasable programmable non-volatile memory 1020 on a separate IC chip, other non-volatile storage devices 1030, and other peripheral devices 1040. In some embodiments, processor or computing device 1010 and flash memory 1020 are separate IC chips disposed on the same system circuit board. The peripheral devices can include an external communication interface for establishing communication channels between the computing device and one or more network-based services or other computing devices. In some embodiments, the peripheral devices may be implemented using multiple discrete hardware elements, such as multiple cards or other devices.

In some embodiments, the computing device is also configured to have capability for updating cryptographic keys. For example, in system 1000 illustrated in FIG. 10, computing device 1010 has a first memory 1019 storing a first cryptographic key 1050, and has a second memory 1020 storing a second cryptographic key 1060. In an embodiment, the first memory is a fuse-based memory, and the first cryptographic key can be a key associated with a symmetric cryptographic algorithm, e.g., an advanced encryption standard (AES). In an embodiment, the second memory is a flash memory, and the second cryptographic key can be a key associated with an asymmetric cryptographic algorithm, e.g., RSA. As shown in FIG. 10, processor 1012 in computing device 1010 is configured to receive information related to a second cryptographic key through network interface 1015 from a cryptographic key provisioning system or provisioning server 1080 through network(s) 1090. In an embodiment, the second cryptographic key is associated with an asymmetric cryptographic algorithm, e.g., an RSA (Rivest-Shamir-Adleman) private key. In other embodiments, the second cryptographic key is associated with ECC (Elliptic Curve Cryptography). In some embodiments, the information related to the second cryptographic key can be an encrypted second private key. For example, the second private key can be encrypted using the first cryptographic key.

In some embodiments, the second memory, e.g., a flash memory can store a symmetric key as the second cryptographic key, instead of a private key or digital certificate described previously. In some embodiments, the computing device can be configured to receive a replacement symmetric key, e.g., an AES key as the second cryptographic key through network interface 1015 from a cryptographic key provisioning system or provisioning server 1080 through network(s) 1090. The computing device can then encrypt the replacement symmetric key using the first cryptographic key 1050 and replace the current encrypted symmetric key.

In some embodiments, the information related to a second cryptographic key received by computing device 1010 can include a reduced set of information that can be used for the computing device to derive the second cryptographic key. For example, the computing device can be configured to receive a new set of prime numbers from the provisioning server, and use the new set of prime numbers to generate a new RSA key pair. In some embodiments, other reduced sets of information can be used for other cryptographic methods. For example, parameters for elliptic curve cryptography (ECC) can be stored in the persistent memory, and then used to generate an ECC public key. In this case, the reduced set of information can include the elliptic curve specification and a prime number.

In some embodiments, the communication between the computing device and the key provisioning system is carried out through a secure channel by encrypting the data, the channel or both. In some cases, the entire channel is secure, or only the data is encrypted. For example, the secure channel can be implemented using Secure Sockets Layer (SSL), Transport Layer Security (TLS), or Internet Protocol Security (IPsec). In some embodiments, the communication between the computing device and the key provisioning system is carried out through a proprietary application programming interface (API) or an interface based on an IPMI (Intelligent Platform Management Interface) specification.

Transport Layer Security (TLS) and Secure Sockets Layer (SSL) are cryptographic protocols designed to provide communication security over the Internet. They use X.509 certificates and hence asymmetric cryptography to authenticate the counterparty with whom they are communicating and to exchange a symmetric key. This session key is then used to encrypt data flowing between the parties. This allows for data/message confidentiality, and message authentication codes for message integrity and as a by-product, message authentication.

Internet Protocol Security (IPsec) is a protocol suite for securing Internet Protocol (IP) communications by authenticating and encrypting each IP packet of a communication session. IPsec includes protocols for establishing mutual authentication between agents at the beginning of the session and negotiation of cryptographic keys to be used during the session. Internet Protocol security (IPsec) uses cryptographic security services to protect communications over Internet Protocol (IP) networks. IPsec supports network-level peer authentication, data origin authentication, data integrity, data confidentiality (encryption), and replay protection. IPsec is an end-to-end security scheme operating in the Internet Layer of the Internet Protocol Suite, while some other Internet security systems in widespread use, such as Transport Layer Security (TLS) and Secure Shell (SSH), operate in the upper layers at Application layer. Hence, only IPsec protects any application traffic over an IP network. Applications can be automatically secured by IPsec at the IP layer.

The Intelligent Platform Management Interface (IPMI) is a set of computer interface specifications for an autonomous computer subsystem that provides management and monitoring capabilities independently of the host system's CPU, firmware (BIOS or UEFI) and operating system. IPMI defines a set of interfaces used by system administrators for out-of-band management of computer systems and monitoring of their operation. For example, IPMI provides a way to manage a computer that may be powered off or otherwise unresponsive by using a network connection to the hardware rather than to an operating system or login shell. In IPMI, only the data is encrypted.

In computing device 1010, processor 1012 is configured to derive the second cryptographic key from the information related to a second cryptographic key. For example, the encrypted second key is decrypted. Here, the first cryptographic key is being characterized by a fewer number of bits than the second cryptographic key. In the example described above, the symmetric key, e.g., AES key, has a fewer number of bits than the asymmetric key, e.g., RSA key. Processor 1012 is further configured to encrypt the second cryptographic key using the first cryptographic key and store the encrypted second cryptographic key in a second memory. For example, the RSA key is encrypted using the AES key and stored in memory 1020, which can be an electrically erasable programmable non-volatile memory, such as a flash memory.

Similar to system 300 illustrated in FIG. 3, system 1000 can decrease the cost of making the computing device by reducing fuse device storage die area and fuse burning time by storing the encrypted private key in an electrically erasable programmable non-volatile memory. As described above, system 1000 has the additional capability for updating the private key in the system. Such key update may be triggered by the determination that the current private key has been compromised, the number of cryptographic operations using the existing private key has reached a preset limit, the volume of data encrypted using the first private key has reached a preset limit, or the elapsed time of using the first private key has reached a preset limit.

Figure 11:
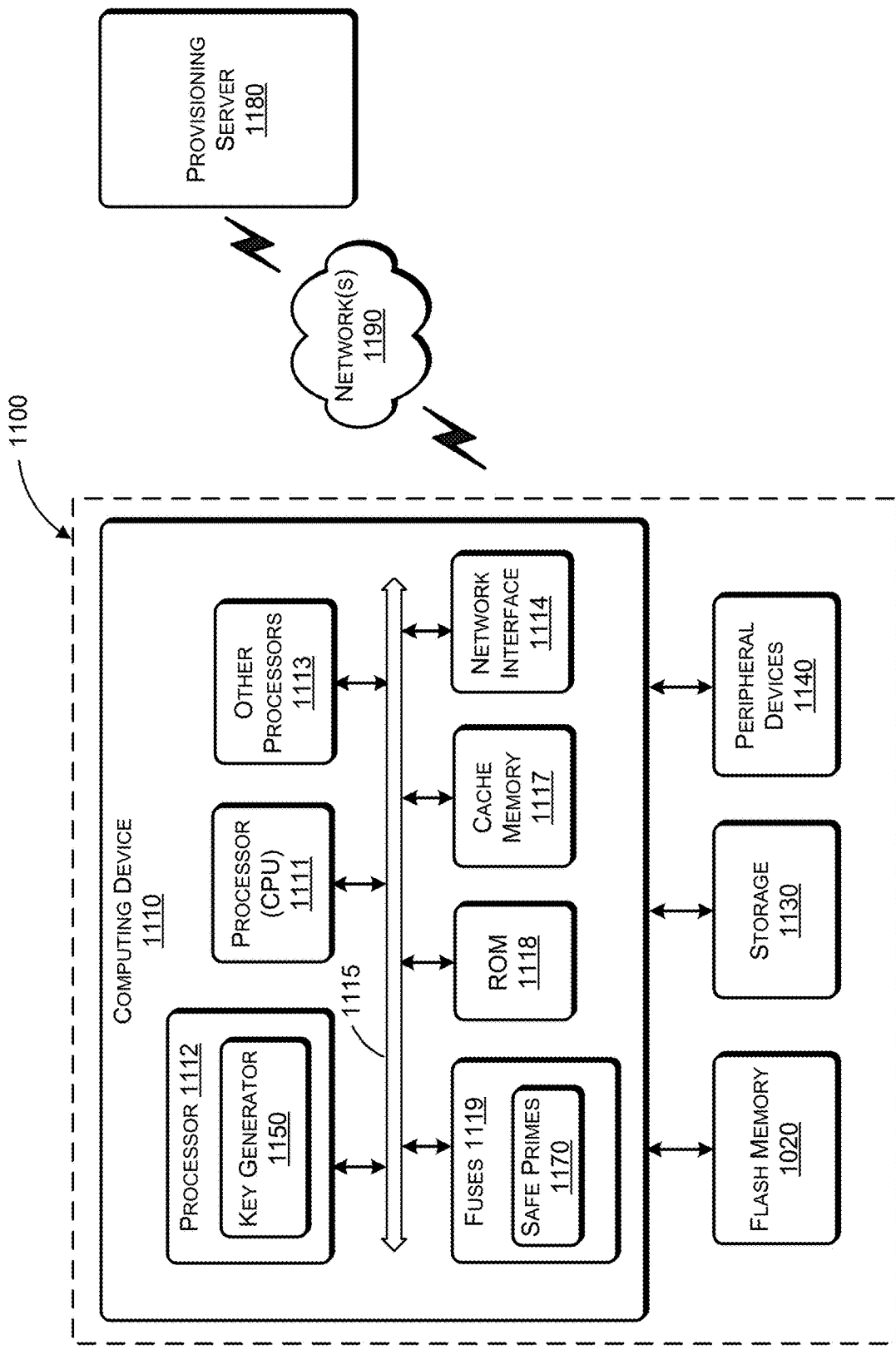
FIG. 11 illustrates a computing device including an encryption key generator according to one embodiment of the disclosed technologies.

FIG. 11 illustrates a computing device including updating cryptographic keys according to another embodiment of the disclosed technologies. System 1100 has similar components as system 500 illustrated in FIG. 5 and system 1000 illustrated in FIG. 10. For example, processor 1111, other processors 1113, cache memory 1117, ROM 1118, flash memory 1020, storage 1130, peripheral devices 1140 all have similar functionalities as their counterparts in system 1000 in FIG. 10. However, in this embodiment, processor 1112 in computing device 1110 includes a cryptographic key generator 1150. It is noted that processor 1112 and cryptographic key generator 1150 are included in FIG. 11 for convenience of illustration. In embodiments of the disclosed technologies, use of a separate security processor is optional. Security related functions can be implemented by other means, for example, by computer code executed by one or more processors, by hardware, or combinations thereof.

System 1100 has a reduced set of information 1170 associated with a private key stored in a persistent memory, for example, in fuse-based memory 1119. Depending on the embodiments, the reduced set of information 1170 can be two or more pairs of safe prime numbers suitable for generating a private key in an RSA cryptographic scheme. In this example, safe prime numbers 1170 are provisioned in fuse-based memory 1119 during the manufacturing of computing device 1110. During operation, key generator 1150 is configured to access the safe prime numbers 1170 in fuse-based memory 1119, and use the prime numbers to generate public and private keys for RSA cryptography.

In computing device 1110, processor 1112 is configured to derive a first private key using the reduced set of information, e.g., a first pair of prime numbers and to use the first private key for performing cryptographic operations. An example of deriving a private key from a reduced set of information is described above in connection with FIGS. 5-7. Further, processor 1112 is also configured to detect a trigger event, and upon receiving the trigger event, derive a second private key using a second pair of prime numbers, and replace the first private key with the second private key. Depending on the embodiment, the processor can respond to different trigger events to update the keys. For example, the trigger event comprises the number of cryptographic operations performed using the first private key reaching a preset number. Alternatively, the trigger event can be an elapsed time of using the first private key reaching a preset limit. Further, the trigger event can be the processor receiving a command from a key provisioning system 1180 through network interface 1114 to update the keys. More details about communication of computing device 1110 with the key provisioning server 1190 through the network(s) 1190 are described above in connection with FIG. 10.

In some embodiments, computer device 1110 can have a group of prime numbers stored in the fuses 1119. Fuses 1119 are an example of persistent memory that can be used for this purpose. Various pairs of prime numbers can be formed using different combinations of the stored prime numbers. Each pair can be used for deriving an asymmetric key pair. In some embodiments, the various pairs of prime numbers can be indexed, and the index can be used by computing device to select pairs of prime numbers for generating keys. Further, the key provisioning system 1180 can issue a command to the computing device to update the keys using the prime numbers referred to by an index. In one implementation, the command comprises the index. In another implementation, the computer device 1110 updates or increments the index based on the command from the key provisioning system 1180.

Figure 12:
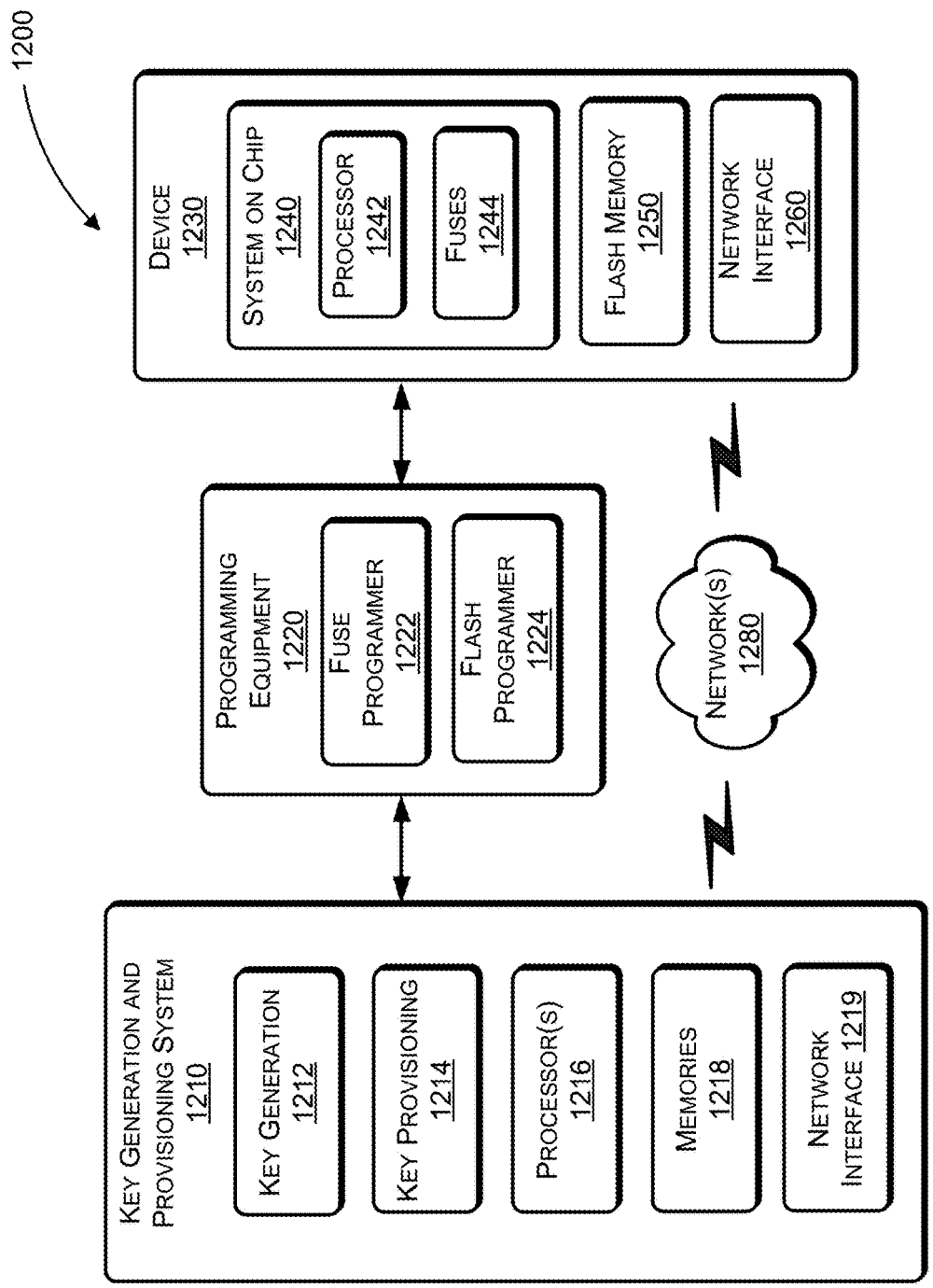
FIG. 12 illustrates an encryption key provisioning system according to one embodiment of the disclosed technologies.

FIG. 12 illustrates an encryption key provisioning system according to one embodiment of the disclosed technologies. In FIG. 12, key provisioning system or provisioning server 1200 includes similar components as key provisioning system 800 illustrated in FIG. 8, but also includes additional key updating capabilities. For example, similar to key provisioning system 800, key provisioning system 1200 includes a key generation and provisioning system 1210, a programming equipment 1220, and a device 1230 for receiving key provisioning. Key generation and provisioning system 1210 can include a key generation unit 1212, which is configured to generate keys for symmetric and asymmetric cryptography using known methods. Key generation and provisioning system 1210 can also include a key provisioning unit 1214, which is configured to manage key provisioning activities. In some embodiments, programming equipment 1220 can include a fuse programmer 1222 and a flash programmer 1224, which are used to program the keys generated by the key generation and provisioning system 1210 into device 1230. Device 1230 can include a computing device or system-on-chip 1240, which can have a processor 1242 and fuses block 1244. Device 1230 can also have a flash memory 1250 disposed in a second IC chip. For example, device 1230 can represent system 1000 in FIG. 10 or system 1100 in FIG. 11. Key provisioning system 1200 can be configured to implement the various embodiments described above.

For example, key provisioning system 1200 illustrated in FIG. 12 provides the functions of key provisioning systems 800 illustrated in FIG. 8 and method 900 illustrated in the flowchart in FIG. 9 as described above. These functions include generating a private key and a public key for an asymmetric cryptographic algorithm, generating a symmetric key for a symmetric cryptographic algorithm, and encrypting the private key using the symmetric key. The functions also include programming a first memory of a computing device with the symmetric key, and programming a second memory with the encrypted private key. These functions also include generating prime numbers or other reduced set of information and programming the prime numbers or reduced set of information into a first memory in a computing device to be used for the computing device to derive cryptographic keys.

In addition, as shown in FIG. 12, key provisioning system 1200 also includes components for providing key updating capabilities. In certain instances, the key provisioning system 1200 may detect trigger events for updating the keys for one or more devices. For example, key generation and provisioning system 1210 also includes a network interface 1219 for communicating with device 1230 through network(s) 1280. Device 1230 also has a network interface 1260 for communicating with network 1280. Further, key generation and provisioning system 1210 also includes processor(s) 1216 and memories 1218. In various embodiments, the key provisioning system can be configured to provide key provisioning functions for the various computing devices described above. The various key provisioning functions are described below with reference to the flowcharts illustrated in FIGS. 13 and 14.

Figure 13:
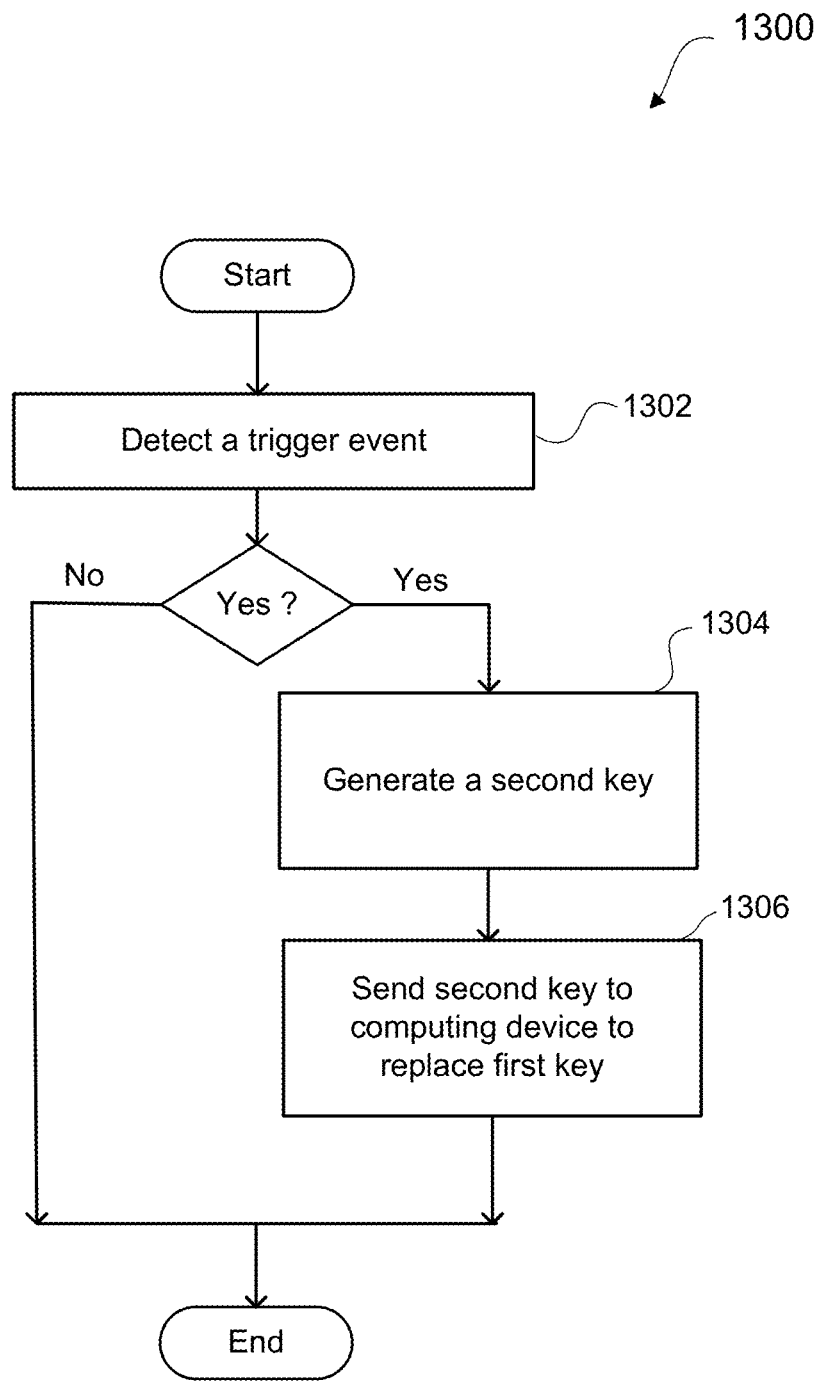
FIG. 13 is a flowchart illustrating a method for key provisioning according to one embodiment of the disclosed technologies.

FIG. 13 is a flowchart illustrating a method for key provisioning according to one embodiment of the disclosed technologies. A method 1300 for encryption key provisioning using a key provisioning system includes processes summarized in the flowchart illustrated in FIG. 13.

Process 1302: Detect a trigger event;
Process 1304: Generate a second key;
Process 1306: Send at least the second key to the computing device with a command for replacing the first key with the second key in the computing device.

In method 1300, key provisioning system 1200 provides the key provisioning method to support the key updating operations of computing device 1000 described above. For example, in process 1302, key provisioning system 1200 is configured to detect a trigger event for updating a key in a computing device. The trigger events can include receiving information that the current key has been compromised, or a timer or a counter reaching a preset limit, etc. In some embodiments, the trigger events can include the volume of data encrypted using the first private key has reached a preset limit, a fixed number of cryptographic operations using the first private key has been reached, or the elapsed time of using the first private key has reached a preset limit, etc. In process 1304, upon receiving the trigger event, key provisioning system 1200 is configured to generate replacement keys, for example, a second private key and a second public key for the asymmetric cryptographic algorithm of the current keys, e.g., RSA. In process 1306, key provisioning system 1200 sends at least the second private key to the computing device with a command for replacing the first key with the second key in the computing device. In key provisioning system 1200, the detection of trigger events and communication with the computing device may involve processor(s) 1216, memories 1218, and network interface 1219, etc. The communication between the key provisioning system and the computing device can be carried out through a network with the security and encryption measures described above.

As described above in connection with system 1000, after receiving the replacement key (i.e., the second key), the computing device encrypts the replacement key and stores it in a second memory, e.g., a flash memory, for use in cryptographic operations. In some instances, the previously stored encrypted key is replaced with the encrypted replacement key in the second memory. In some instances, the replacement key (i.e., the second key) is a private key. In other instances, the replacement key is a symmetric key. Depending on the embodiments, the key provisioning system and the computing device can be configured to perform other functions. For example, in some embodiments, the computing device can receive a replacement symmetric key, e.g., an AES key from the provisioning system. The computing device can then encrypt the current private key using the replacement AES key and store the encrypted private key in the second memory.

Figure 14:
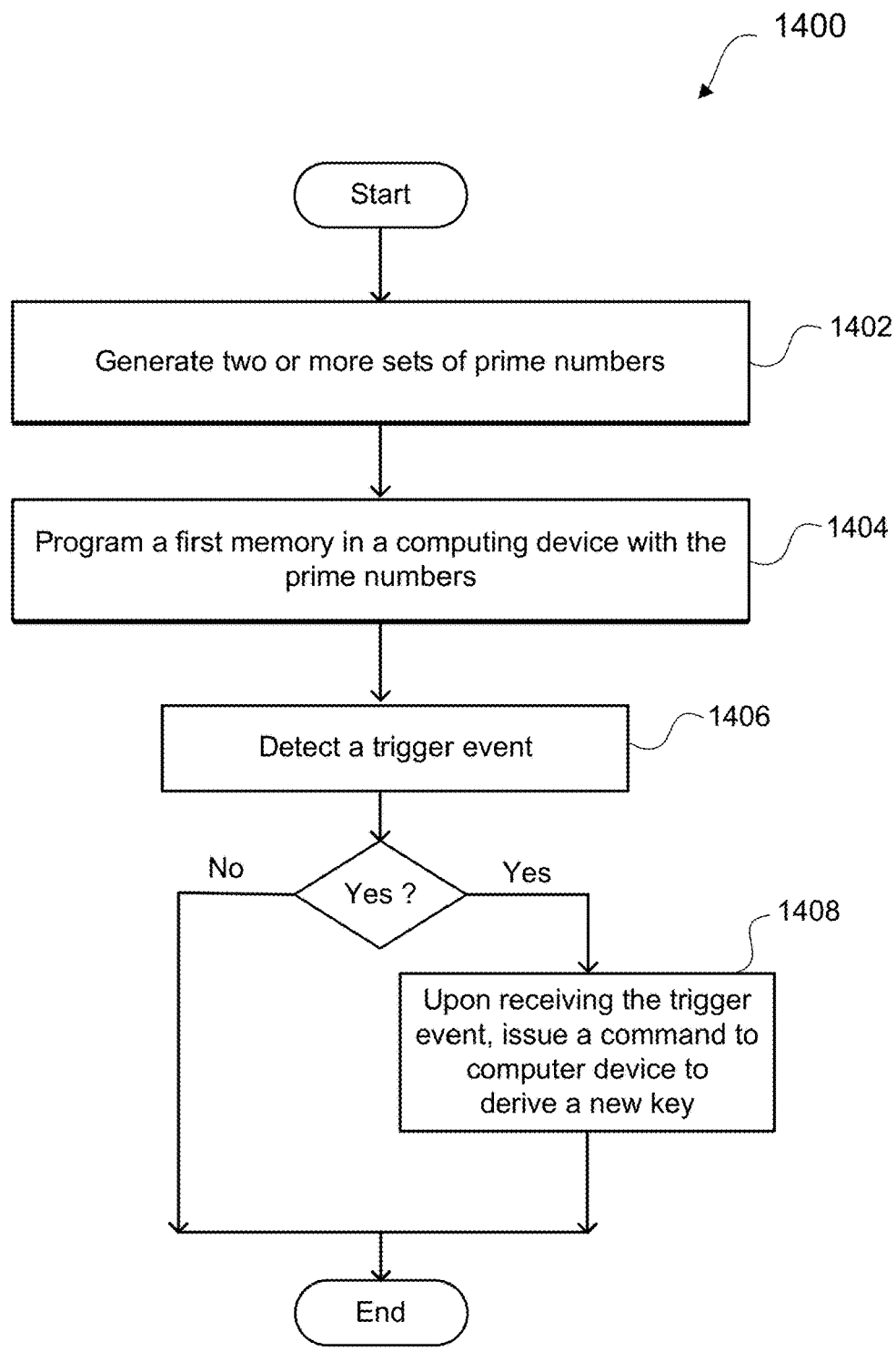
FIG. 14 is a flowchart illustrating a method for key provisioning according to one embodiment of the disclosed technologies.

FIG. 14 is a flowchart illustrating a method 1400 for provisioning a device for key updating according to one embodiment of the disclosed technologies. Method 1400 for encryption keys using a key provisioning system includes processes summarized below.

Process 1402: Generate two or more sets of prime numbers;
Process 1404: Store prime numbers in a first memory of computing device;
Process 1406: Detect a trigger event;
Process 1408: Upon receiving the trigger event, issuing a command to the computing device to derive a second cryptographic key using a second set of prime numbers.

Method 1400 can be implemented using key provisioning system 1200. For example, in process 1402, key provisioning system 1200 is configured to generate two or more sets of prime numbers or two or more reduced sets of information suitable for deriving keys for an asymmetric cryptographic scheme, e.g., RSA. In process 1404, key provisioning system 1200 stores or programs prime numbers or reduced sets of information into a first memory of a computer device, e.g., device 1230 in FIG. 12. The first memory can be a persistent memory, such as a fuse-based memory. In some embodiments, the computing device is configured to generate the keys using the prime numbers or other reduced set of information. In addition, the computing device is configured to generate a new set of keys upon detecting a trigger event. As described above in connection with system 1100, the trigger events can include receiving information that the current key has been compromised, a timer or a counter reaching a preset limit, or receiving a command from a key provisioning system to update the key. Thus, in some embodiments, method 1400 can include process 1406, in which key provisioning system 1200 is configured to detect a trigger event for updating keys in a computing device. In process 1408, upon receiving the trigger event, the key provisioning system issues a command to the computing device to derive a second cryptographic key using a second set of prime numbers.

In one embodiment, the key provisioning system of FIG. 12 may send a command to either update/increment the index for selecting the second set of prime numbers or send the index for selecting the second set of prime numbers to the computing device. In another embodiment, the computing device may locally determine a trigger event and update/increment the index for selecting the second set of prime numbers. As illustrated in FIG. 12, the communication between the key provisioning system and the computing device can be carried out through a network with the security and encryption measures described above.

Depending on the embodiments, the functions of the key provisioning system described above can be implemented in a single key provisioning system, such as key provisioning system 1200. Alternatively, in different key provisioning systems. For example, a first key provisioning system can be configured for key provisioning functions during device manufacturing, and a second key provisioning system can be configured for key update functions when the device is in operation.

The processes described herein, or variations and/or combinations thereof, may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 15:
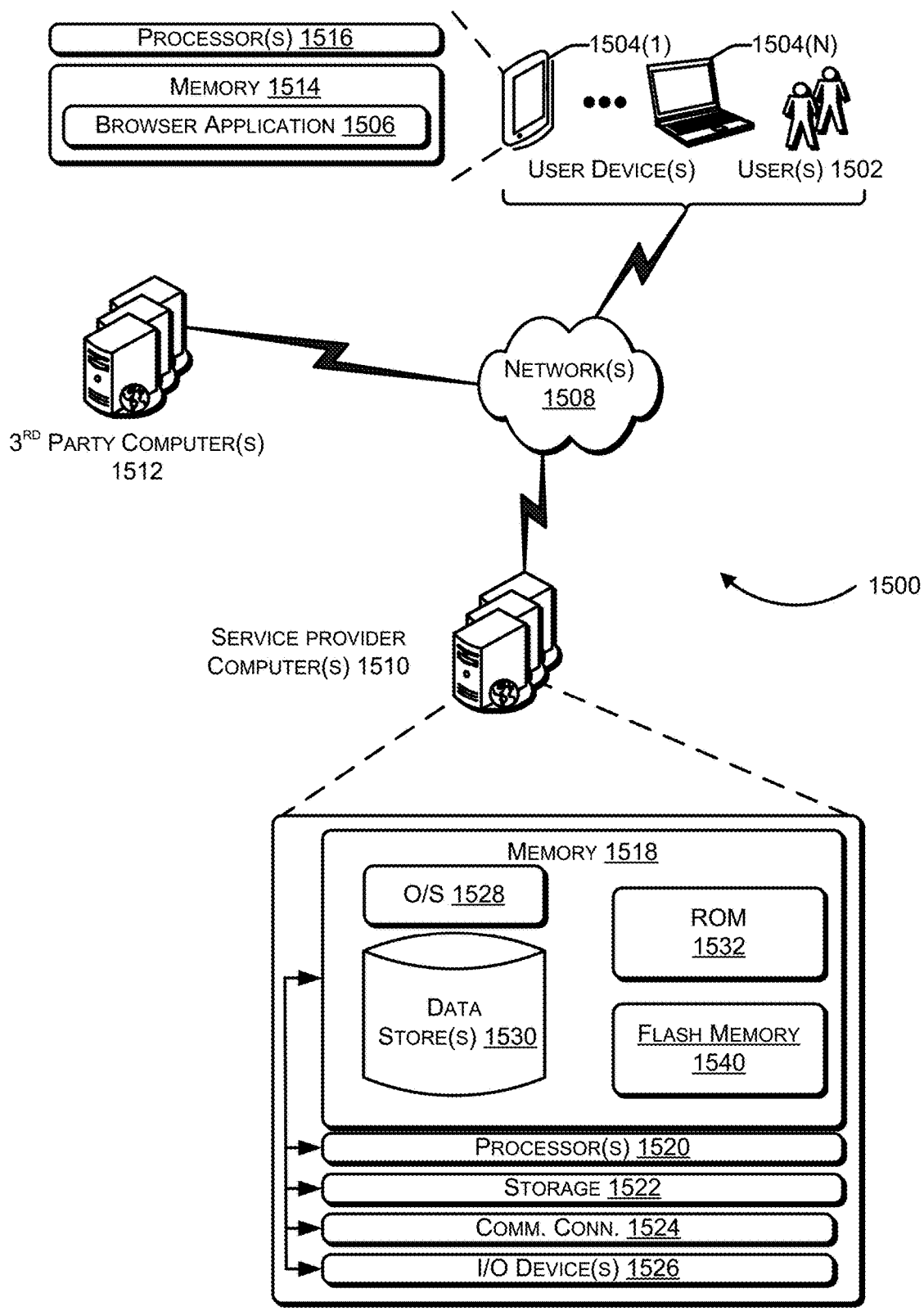
FIG. 15 illustrates an exemplary architecture for features and systems described herein that includes one or more service provider computers and/or a user device connected via one or more networks, according to at least one exemplary embodiment.

FIG. 15 illustrates an exemplary architecture for features and systems described herein that includes one or more service provider computers and/or a user device connected via one or more networks, according to at least one exemplary embodiment. The devices discussed in FIGS. 1-14, may use one or more components of the computing devices described in FIG. 15 or may represent one or more computing devices described in FIG. 15. In architecture 1500, one or more users 1502 may utilize user computing devices 1504(1)-(N) (collectively, user devices 1504) to access application 1506 (e.g., a web browser or mobile device application), via one or more networks 1508. In some aspects, application 1506 may be hosted, managed and/or provided by a computing resources service or service provider. One or more service provider computers 1510 may provide a native application which is configured to run on user devices 1504 which user(s) 1502 may interact with. Service provider computer(s) 1510 may, in some examples, provide computing resources such as, but not limited to, client entities, low latency data storage, durable data storage, data access, management, virtualization, cloud-based software solutions, electronic content performance management, etc. Service provider computer(s) 1510 may also be operable to provide web hosting, computer application development and/or implementation platforms, combinations of the foregoing or the like to user(s) 1502. Service provider computer(s) 1510, in some examples, may communicate with one or more third party computers 1512.

In some examples, network(s) 1508 may include any one or a combination of many different types of networks, such as cable networks, the Internet, wireless networks, cellular networks and other private and/or public networks. While the illustrated example represents user(s) 1502 accessing application 1506 over network(s) 1508, the described techniques may equally apply in instances where user(s) 1502 interact with service provider computer(s) 1510 via user device(s) 1504 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, application 1506 may allow user(s) 1502 to interact with service provider computer(s) 1510 such as to access web content (e.g., web pages, music, video, etc.). Service provider computer(s) 1510, perhaps arranged in a cluster of servers or as a server farm, may host application 1506 and/or cloud-based software services. Other server architectures may also be used to host application 1506. Application 1506 may be capable of handling requests from many users 1502 and serving, in response, various item web pages. Application 1506 can provide any type of website that supports user interaction, including social networking sites, online retailers, informational sites, blog sites, search engine sites, news and entertainment sites and so forth. As discussed above, the described techniques can similarly be implemented outside of application 1506, such as with other applications running on user device(s) 1504.

User device(s) 1504 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, user device(s) 1504 may be in communication with service provider computer(s) 1510 via network(s) 1508, or via other network connections. Additionally, user device(s) 1504 may be part of the distributed system managed by, controlled by or otherwise part of service provider computer(s) 1510 (e.g., a console device integrated with service provider computers 1510).

In one illustrative configuration, user device(s) 1504 may include at least one memory 1514 and one or more processing units (or processor(s)) 1516. Processor(s) 1516 may be implemented as appropriate in hardware, computer-executable instructions, firmware, or combinations thereof. Computer-executable instruction or firmware implementations of processor(s) 1516 may include computer-executable or machine-executable instructions written in any suitable programming language to perform the various functions described. User device(s) 1504 may also include geo-location devices (e.g., a global positioning system (GPS) device or the like) for providing and/or recording geographic location information associated with user device(s) 1504.

Memory 1514 may store program instructions that are loadable and executable on processor(s) 1516, as well as data generated during the execution of these programs. Depending on the configuration and type of user device(s) 1504, memory 1514 may be volatile (such as random access memory (RAM)) and/or non-volatile (such as read-only memory (ROM), flash memory, etc.). User device(s) 1504 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, memory 1514 may include multiple different types of memory, such as static random access memory (SRAM), dynamic random access memory (DRAM), or ROM.

Turning to the contents of memory 1514 in more detail, memory 1514 may include an operating system and one or more application programs or services for implementing the features disclosed herein including at least a user provided input element or electronic service web page, such as via browser application 1506 or dedicated applications (e.g., smart phone applications, tablet applications, etc.). Browser application 1506 may be configured to receive, store and/or display a website or other interface for interacting with service provider computer(s) 1510. Additionally, memory 1514 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 1504.

In some aspects, service provider computer(s) 1510 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, service provider computer(s) 1510 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, service provider computer(s) 1510 may be in communication with user device(s) 1504 and/or other service providers via network(s) 1508, or via other network connections. Service provider computer(s) 1510 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, service provider computer(s) 1510 may include at least one memory 1518 and one or more processing units (or processor(s)) 1520. Processor(s) 1520 may be implemented as appropriate in hardware, computer-executable instructions, firmware or combinations thereof. Computer-executable instruction or firmware implementations of processor(s) 1520 may include computer-executable or machine-executable instructions written in any suitable programming language to perform the various functions described.

In some instances, hardware processor(s) 1520 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

Memory 1518 may store program instructions that are loadable and executable on processor(s) 1520, as well as data generated during the execution of these programs. Depending on the configuration and type of service provider computer(s) 1510, memory 1518 may be volatile (such as RAM) and/or non-volatile (such as ROM, flash memory, etc.). Service provider computer(s) 1510 or servers may also include additional storage 1522, which may include removable storage and/or non-removable storage. The additional storage 1522 may include, but is not limited to, magnetic storage, optical disks and/or tape storage. The disk drives and their associated computer-readable media may provide non-volatile storage of computer-readable instructions, data structures, program modules and other data for the computing devices. In some implementations, memory 1518 may include multiple different types of memory, such as SRAM, DRAM, or ROM.

Memory 1518 and the additional storage 1522, both removable and non-removable, are all examples of computer-readable storage media. For example, computer-readable storage media may include volatile or non-volatile, removable or non-removable media implemented in any method or technology for storage of information such as computer-readable instructions, data structures, program modules or other data. Memory 1518 and the additional storage 1522 are all examples of computer storage media. Additional types of computer storage media that may be present in service provider computer(s) 1510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by service provider computer(s) 1510. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

Service provider computer(s) 1510 may also contain communications connection(s) 1524 that allow service provider computer(s) 1510 to communicate with a stored database, another computing device or server, user terminals and/or other devices on network(s) 1508. Service provider computer(s) 1510 may also include I/O device(s) 826, such as a keyboard, a mouse, a pen, a voice input device, a touch input device, a display, speakers, a printer and the like.

Memory 1518 may include an operating system 1528, one or more data stores 1530 and/or one or more application programs or services for implementing the features disclosed herein, including a management buffer 1532 and a logging buffer 1540. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 15, and/or functions described herein can be provided by one or more modules that exist as separate modules and/or module functions described herein can be spread over multiple modules.

The devices and methods discussed in connection with FIGS. 1-14 may represent one or more computing devices illustrated in FIG. 15. For example, system 300 in FIG. 3, system 500 in FIG. 5, system 1000 in FIG. 10, system 1100 in FIG. 11, and system 1200 in FIG. 12 may include certain features in service provider computer(s) 1510 or user device(s) 1504 in FIG. 15. In this regard, memory 1018 in service provider computer(s) 1510 may include ROM 1532 and flash memory 1540 for implementing the security functions described above. Similarly, memory 1514 in user devices(s) 1504 may include fuses and flash memories for implementing the security functions.

Figure 16:
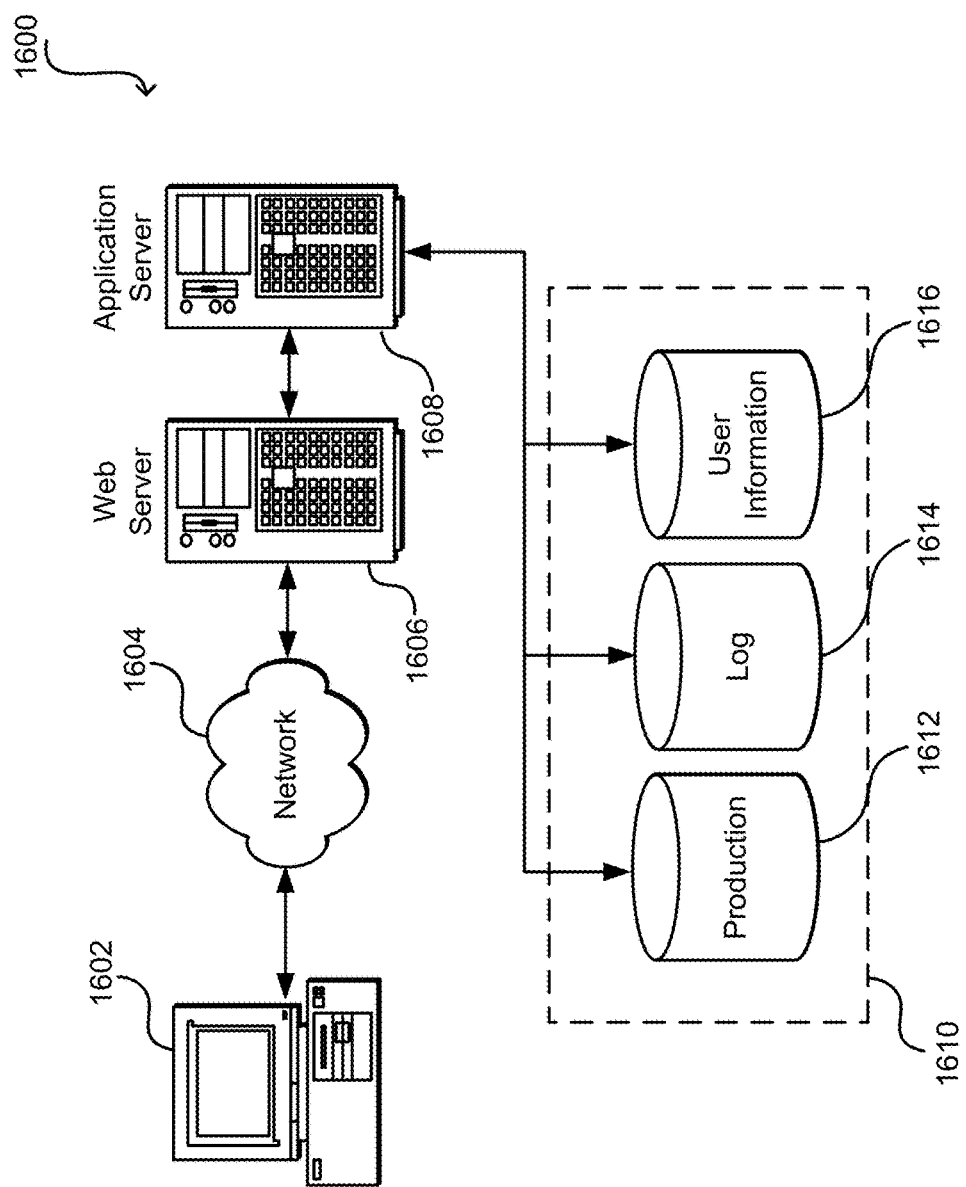
FIG. 16 illustrates an environment in which various embodiments can be implemented.

FIG. 16 illustrates aspects of an example environment 1600 for implementing aspects in accordance with various embodiments. As will be appreciated, although a Web-based environment is used for purposes of explanation, different environments may be used, as appropriate, to implement various embodiments. The environment includes an electronic client device 1602, which can include any appropriate device operable to send and receive requests, messages or information over an appropriate network 1604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1606 for receiving requests and serving content in response thereto, although for other networks an alternative device serving a similar purpose could be used as would be apparent to one of ordinary skill in the art.

The illustrative environment includes at least one application server 1608 and a data store 1610. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1602 and the application server 1608, can be handled by the Web server. It should be understood that the Web and application servers are not required and are merely example components, as structured code discussed herein can be executed on any appropriate device or host machine as discussed elsewhere herein.

The data store 1610 can include several separate data tables, databases or other data storage mechanisms and media for storing data relating to a particular aspect. For example, the data store illustrated includes mechanisms for storing production data 1612 and user information 1616, which can be used to serve content for the production side. The data store also is shown to include a mechanism for storing log data 1614, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1610. The data store 1610 is operable, through logic associated therewith, to receive instructions from the application server 1608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depiction of the system 1600 in FIG. 16 should be taken as being illustrative in nature and not limiting to the scope of the disclosure.

In FIG. 16, electronic client device 1602, web server 1606, and application server 1608 may include features discussed above in connection with FIGS. 1-14. For example, system 1000 in FIG. 10 or system 1100 in FIG. 11 may represent certain security function features in electronic client device 1602, web server 1606, and application server 1608 in FIG. 16.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A cryptographic key provisioning system, comprising:
a key generation system configured to generate cryptographic keys, and
a programming equipment, including a fuse programmer and an EEPROM (electrically erasable programmable read-only memory) programmer for programming cryptographic keys into a computing device, the computing device comprising:
a persistent memory; and
an electrically erasable programmable non-volatile memory;
wherein the cryptographic key provisioning system is configured to:
generate a symmetric key associated with a symmetric cryptographic algorithm;
store the symmetric key in the persistent memory of the computing device using the fuse programmer;
generate a first private key associated with an asymmetric cryptographic algorithm, the first private key is larger in size than the symmetric key;
encrypt the first private key using the symmetric key; and
store the encrypted first private key in the EEPROM in the computing device, thereby enabling the computing device to retrieve the encrypted first private key from the EEPROM, decrypt it using the symmetric key from the persistent memory, and use the decrypted first private key for performing asymmetric cryptographic operations.

2. The cryptographic key provisioning system of claim 1, further comprising a network interface for communicating with the computing device.

3. The cryptographic key provisioning system of claim 2, wherein the cryptographic key provisioning system is configured to generate a second private key and to send the second private key to the computing device for replacing the first private key.

4. The cryptographic key provisioning system of claim 3, wherein the cryptographic key provisioning system is further configured to detect a trigger event and, in response to the trigger event, generate a second private key and to send the second private key to the computing device for replacing the first private key.

5. The cryptographic key provisioning system of claim 3, wherein the cryptographic key provisioning system is configured encrypt the second private key using the symmetric key before sending the encrypted second private key to the computing device.

6. A cryptographic key provisioning system, comprising:
a key generation system configured to generate cryptographic keys; and
a programming equipment, for programming cryptographic information into a computing device, the computing device comprising:
a persistent memory; and
an electrically erasable programmable non-volatile memory (EEPROM);
wherein the cryptographic key provisioning system is configured to:
generate a first cryptographic key;
store the first cryptographic key in the persistent memory of the computing device using the programming equipment;
generate a second cryptographic key, the first cryptographic key comprising fewer bits than the second cryptographic key;
encrypt the second cryptographic key using the first cryptographic key; and
store the encrypted second cryptographic key in the EEPROM in the computing device, thereby enabling the computing device to retrieve the encrypted second cryptographic key from the EEPROM, decrypt it using the first cryptographic key from the persistent memory, and use the decrypted second cryptographic key for performing cryptographic operations.

7. The cryptographic key provisioning system of claim 6, wherein the persistent memory is a fuse-based memory, and the electrically erasable programmable non-volatile memory is a flash memory.

8. The cryptographic key provisioning system of claim 6, wherein the first cryptographic key is associated with a symmetric cryptographic algorithm and the second cryptographic key is associated with an asymmetric cryptographic algorithm.

9. A cryptographic key provisioning system, comprising:
a key generation system configured to generate cryptographic keys; and
a programming equipment, for programming cryptographic information into a computing device, the computing device comprising:
a persistent memory; and
an electrically erasable programmable non-volatile memory;
wherein the cryptographic key provisioning system is configured to:
generate a first cryptographic key;

store the first cryptographic key in the persistent memory of the computing device using the programming equipment;

generate a second cryptographic key, the first cryptographic key comprising fewer bits than the second cryptographic key;

encrypt the second cryptographic key using the first cryptographic key; and store the encrypted second cryptographic key in the electrically erasable programmable non-volatile memory in the computing device;

wherein the cryptographic key provisioning system is further configured to detect a trigger event and, in response to the trigger event, generate information for a third cryptographic key and to send the information for the third cryptographic key to the computing device for replacing the second cryptographic key.

10. The cryptographic key provisioning system of claim 6, wherein the cryptographic key provisioning system is further configured to generate information for a third cryptographic key and to send the information for the third cryptographic key to the computing device for replacing the second cryptographic key, the first cryptographic key comprising fewer bits than the third cryptographic key.

11. The cryptographic key provisioning system of claim 10, wherein the information for the third cryptographic key comprises one or more prime numbers that are used to generate the third cryptographic key.

12. The cryptographic key provisioning system of claim 10, wherein the information for the third cryptographic key comprises the third cryptographic key encrypted using the first cryptographic key.

13. The cryptographic key provisioning system of claim 10, wherein the first cryptographic key is associated with a symmetric cryptographic algorithm, and the second cryptographic key and the third cryptographic key are associated with an asymmetric cryptographic algorithm.

14. The cryptographic key provisioning system of claim 13, wherein symmetric cryptographic algorithm comprises an advanced encryption standard (AES) algorithm, and the asymmetric cryptographic algorithm comprises an RSA (Rivest-Shamir-Adleman) algorithm.

15. The cryptographic key provisioning system of claim 10, wherein the first cryptographic key is associated with a first symmetric cryptographic algorithm, and the second cryptographic key and the third cryptographic key are associated with a second symmetric cryptographic algorithm.

\* \* \* \* \*